(12) United States Patent
Matsusue et al.

(10) Patent No.: US 10,593,970 B2
(45) Date of Patent: Mar. 17, 2020

(54) OUTPUT PERFORMANCE RECOVERING DEVICE FOR FUEL CELL AND OUTPUT PERFORMANCE RECOVERING METHOD FOR FUEL CELL

(71) Applicant: TOYOTA JIDOSHA KABUSHIKI KAISHA, Toyota-shi, Aichi-ken (JP)

(72) Inventors: Masaaki Matsusue, Mishima (JP); Yasushi Araki, Gotenba (JP); Masayuki Ito, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 160 days.

(21) Appl. No.: 15/714,461

(22) Filed: Sep. 25, 2017

(65) Prior Publication Data

US 2018/0097245 A1    Apr. 5, 2018

(30) Foreign Application Priority Data

Oct. 4, 2016    (JP) .................................. 2016-196715

(51) Int. Cl.
*H01M 8/10* (2016.01)
*B60L 7/14* (2006.01)
(Continued)

(52) U.S. Cl.
CPC ......... *H01M 8/04559* (2013.01); *B60L 1/003* (2013.01); *B60L 7/14* (2013.01);
(Continued)

(58) Field of Classification Search
CPC ..... H01M 2250/20; H01M 8/04; Y02T 90/32; Y02T 90/34; Y02T 10/7044; Y02T 10/705
See application file for complete search history.

(56) References Cited

U.S. PATENT DOCUMENTS

2009/0120699 A1*  5/2009  Suzuki .................... B60L 58/16
                                                    180/65.265
2009/0130509 A1*  5/2009  Manabe ................ H01M 8/008
                                                    429/500
(Continued)

FOREIGN PATENT DOCUMENTS

| JP | 2004282456 A | 10/2004 |
| JP | 2004362787 A | 12/2004 |
| JP | 2005-044749 A | 2/2005 |
| JP | 2007-053051 A | 3/2007 |
| JP | 2010-027297 A | 2/2010 |
| JP | 2010-040285 A | 2/2010 |

(Continued)

*Primary Examiner* — Imran Akram
(74) *Attorney, Agent, or Firm* — Hunton Andrews Kurth LLP

(57) ABSTRACT

An output performance recovering device for a fuel cell includes: a diagnosis unit configured to determine whether it is necessary to recover a catalyst of a fuel cell mounted as a power source for traveling in a vehicle from short-term performance deterioration; a recovery unit configured to control a voltage of the fuel cell and to perform recovery processing for recovering the catalyst from the short-term performance deterioration; a calculation unit configured to calculate a parameter correlated with a predicted output value of the fuel cell which has been predicted to be output on a scheduled traveling route of the vehicle based on a gradient of the scheduled traveling route of the vehicle and a predicted vehicle speed of the vehicle on the scheduled traveling route; and a determination unit configured to determine whether the parameter indicates the predicted output value is greater than a first threshold value.

9 Claims, 15 Drawing Sheets

(51) Int. Cl.
  *B60L 1/00* (2006.01)
  *H01M 8/04537* (2016.01)
  *B60L 50/51* (2019.01)
  *B60L 50/72* (2019.01)
  *B60L 58/40* (2019.01)
  *B60L 58/33* (2019.01)
  *H01M 16/00* (2006.01)
  *H01M 4/92* (2006.01)
  *H01M 8/04828* (2016.01)

(52) U.S. Cl.
  CPC ............... *B60L 50/51* (2019.02); *B60L 50/72* (2019.02); *B60L 58/33* (2019.02); *B60L 58/40* (2019.02); *H01M 4/92* (2013.01); *H01M 8/0494* (2013.01); *H01M 8/10* (2013.01); *H01M 16/006* (2013.01); *H01M 2250/20* (2013.01); *Y02T 90/34* (2013.01)

(56) References Cited

U.S. PATENT DOCUMENTS

| | | | | |
|---|---|---|---|---|
| 2011/0125692 A1* | 5/2011 | Bernard | ................... | G06N 5/02 706/46 |
| 2012/0065826 A1* | 3/2012 | Kinoshita | ............... | B60L 58/10 701/22 |
| 2015/0125772 A1* | 5/2015 | Matsusue | .......... | H01M 8/04238 429/432 |
| 2015/0372329 A1* | 12/2015 | Jomori | .................. | B60L 3/0053 429/432 |

FOREIGN PATENT DOCUMENTS

| | | |
|---|---|---|
| JP | 2010-067434 A | 3/2010 |
| JP | 2010118252 A | 5/2010 |
| JP | 2011020571 A | 2/2011 |

\* cited by examiner

| POINT | AVERAGE VEHICLE SPEED | POINT | AVERAGE VEHICLE SPEED | POINT | AVERAGE VEHICLE SPEED |
|---|---|---|---|---|---|
| A1 | 35 | B1 | 43 | C1 | 65 |
| A2 | 38 | B2 | 45 | C2 | 67 |
| A3 | ⋮ | B3 | ⋮ | C3 | ⋮ |
| A4 | ⋮ | B4 | ⋮ | C4 | ⋮ |
| ⋮ | ⋮ | ⋮ | ⋮ | ⋮ | ⋮ |

| POINT | AVERAGE OUTPUT | POINT | AVERAGE OUTPUT | POINT | AVERAGE OUTPUT |
|---|---|---|---|---|---|
| A1 | 24 | B1 | 38 | C1 | 42 |
| A2 | 26 | B2 | 39 | C2 | 45 |
| A3 | ⋮ | B3 | ⋮ | C3 | ⋮ |
| A4 | ⋮ | B4 | ⋮ | C4 | ⋮ |
| ⋮ | ⋮ | ⋮ | ⋮ | ⋮ | ⋮ |

OUTPUT PERFORMANCE RECOVERING DEVICE FOR FUEL CELL AND OUTPUT PERFORMANCE RECOVERING METHOD FOR FUEL CELL

INCORPORATION BY REFERENCE

The disclosure of Japanese Patent Application No. 2016-196715 filed on Oct. 4, 2016 including the specification, drawings and abstract is incorporated herein by reference in its entirety.

BACKGROUND

1. Technical Field

The disclosure relates to an output performance recovering device for a fuel cell and an output performance recovering method for a fuel cell.

2. Description of Related Art

In a fuel cell which is mounted as a power source for traveling in a vehicle, output performance of the fuel cell may deteriorate over a short term due to short-term deterioration in performance of a catalyst of the fuel cell. In this case, a process for recovering performance of the catalyst from the short-term performance deterioration by controlling an output voltage of the fuel cell is known. It is also known that performance of the catalyst deteriorates over a long term by repeatedly performing such recovery processing and thus output performance of the fuel cell deteriorates over a long term (for example, see Japanese Patent Application Publication No. 2010-027297).

SUMMARY

When such a vehicle travels on an uphill road or travels at a high speed, a high output is required for the fuel cell. However, when a high output is required for the fuel cell in a state in which the output performance of the fuel cell has deteriorated over a short term as described above, there is a likelihood that the output of the fuel cell will not reach the required high output. Accordingly, it is conceivable that the output performance is recovered from short-term deterioration by performing recovery processing to cope with a request for a high output, but when a recovery processing frequency is high as described above, there is a likelihood that the output performance of the fuel cell will deteriorate over along term.

Therefore, the present disclosure provides an output performance recovering device for a fuel cell and an output performance recovering method for a fuel cell that can cope with a request for a high output for the fuel cell and that have long-term deterioration of output performance of the fuel cell minimized.

According to an aspect of the disclosure, there is provided an output performance recovering device for a fuel cell, including: a recovery unit configured to control a voltage of a fuel cell which is mounted as a power source for traveling in a vehicle and to perform recovery processing for recovering a catalyst of the fuel cell from short-term performance deterioration, wherein the recovery unit is configured not to perform the recovery processing when it is not necessary to recover the catalyst from the short-term performance deterioration, the recovery unit is configured to perform the recovery processing when it is necessary to recover the catalyst from the short-term performance deterioration and a parameter correlated with a predicted output value of the fuel cell, which has been predicted to be output on a scheduled traveling route of the vehicle and which has been calculated based on a predicted vehicle speed of the vehicle on the scheduled traveling route, indicates that the predicted output value is greater than a first threshold value, and the recovery unit is configured not to perform the recovery processing when the parameter indicates that the predicted output value is less than the first threshold value and it is necessary to recover the catalyst from the short-term performance deterioration.

By not performing the recovery processing when it is not necessary to recover the catalyst from the short-term performance deterioration, it is possible to minimize a recovery processing frequency and to minimize long-term deterioration of output performance of the fuel cell. When it is necessary to recover the catalyst from the short-term performance deterioration and the predicted output value of the fuel cell is great, it can be predicted that a high output will be required for the fuel cell in a state in which the output performance of the fuel cell has deteriorated over a short term and thus recovery processing is performed in advance before the high output is required. Accordingly, it is possible to recover the catalyst from a state in which the output performance has deteriorated over a short term and to cope with a request for a high output to the fuel cell. When the predicted output value of the fuel cell is small, it can be predicted that a high output will not be required for the fuel cell and it is possible to cope with an output required for the fuel cell even if it is necessary to recover the catalyst from the short-term performance deterioration. In this case, by not performing the recovery processing, it is possible to minimize a recovery processing frequency and to minimize long-term deterioration of output performance of the fuel cell.

The predicted vehicle speed may be calculated based on an average vehicle speed which is an average value of traveling speeds of a vehicle group including or not including the vehicle when the vehicle group travels on the scheduled traveling route.

The output performance recovering device may further include an acquisition unit configured to acquire the predicted vehicle speed or the average vehicle speed from a server.

The parameter may be calculated additionally based on a gradient of the scheduled traveling route.

According to another aspect of the disclosure, there is provided an output performance recovering device for a fuel cell, including: a recovery unit configured to control a voltage of a fuel cell which is mounted as a power source for traveling in a vehicle and to perform recovery processing for recovering a catalyst of the fuel cell from short-term performance deterioration, wherein the recovery unit is configured not to perform the recovery processing when it is not necessary to recover the catalyst from the short-term performance deterioration, the recovery unit is configured to perform the recovery processing when it is necessary to recover the catalyst from the short-term performance deterioration and a parameter correlated with a predicted output value of the fuel cell which has been predicted to be output on a scheduled traveling route of the vehicle, which has been calculated based on at least one of an output of the fuel cell when the vehicle travels on a scheduled traveling route of the vehicle and an output of another fuel cell which is mounted as a power source in another vehicle when the other vehicle travels on the scheduled traveling route, indicates that the predicted output value is greater than a first threshold value, and the recovery unit is configured not to perform the recovery processing when the parameter indicates that the predicted output value is less than the first threshold value even if it is necessary to recover the catalyst from the short-term performance deterioration.

The output performance recovering device may further include an acquisition unit configured to acquire the output from a server.

The predicted output value may be calculated in consideration of an output of the fuel cell which is consumed by an air-conditioning device of the vehicle.

The output performance recovering device may further include an upper-limit output changing unit configured to change an upper limit of an output of the fuel cell. The upper-limit output changing unit may be configured to set the upper limit to be lower when the parameter indicates that the predicted output value is less than the first threshold value and greater than a second threshold value which is less than the first threshold value than when the parameter indicates that the predicted output value is greater than the first threshold value.

The output performance recovering device may further include a state-of-charge changing unit configured to change a target state of charge of a secondary battery that compensates for a shortage of the output of the fuel cell. The state-of-charge changing unit may be configured to set a target state of charge to be higher when the parameter indicates that the predicted output value is less than the first threshold value and greater than a second threshold value which is less than the first threshold value than when the parameter indicates that the predicted output value is greater than the first threshold value.

According to another aspect of the invention, there is provided an output performance recovering method for a fuel cell, including: determining whether it is necessary to recover a catalyst of a fuel cell which is mounted as a power source for traveling in a vehicle from short-term performance deterioration as a diagnosis step; controlling a voltage of the fuel cell and performing recovery processing for recovering the catalyst from the short-term performance deterioration as a recovery step; calculating a parameter correlated with a predicted output value of the fuel cell which has been predicted to be output on a scheduled traveling route of the vehicle based on a predicted vehicle speed of the vehicle on the scheduled traveling route as a calculation step; and determining whether the parameter indicates that the predicted output value is greater than a first threshold value as a determination step, wherein the recovery processing is not performed in the recovery step when a determination result of the diagnosis step is negative, the recovery processing is performed when the determination results of the diagnosis step and the determination step are positive, and the recovery processing is not performed when the determination result of the determination step is negative even if the determination result of the diagnosis step is positive.

According to another aspect of the invention, there is provided an output performance recovering method for a fuel cell, including: determining whether it is necessary to recover a catalyst of a fuel cell which is mounted as a power source for traveling in a vehicle from short-term performance deterioration as a diagnosis step; controlling a voltage of the fuel cell and performing recovery processing for recovering the catalyst from the short-term performance deterioration as a recovery step; calculating a parameter correlated with a predicted output value of the fuel cell which has been predicted to be output on a scheduled traveling route of the vehicle based on at least one of an output of the fuel cell when the vehicle travels on the scheduled traveling route of the vehicle and an output of another fuel cell which is mounted as a power source in another vehicle when the other vehicle travels on the scheduled traveling route as a calculation step; and determining whether the parameter indicates that the predicted output value is greater than a first threshold value as a determination step, wherein the recovery processing is not performed in the recovery step when a determination result of the diagnosis step is negative, the recovery processing is performed when the determination results of the diagnosis step and the determination step are positive, and the recovery processing is not performed when the determination result of the determination step is negative even if the determination result of the diagnosis step is positive.

It is possible to provide an output performance recovering device for a fuel cell and an output performance recovering method for a fuel cell that can cope with a request for a high output to the fuel cell and that have long-term deterioration of output performance of the fuel cell minimized.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
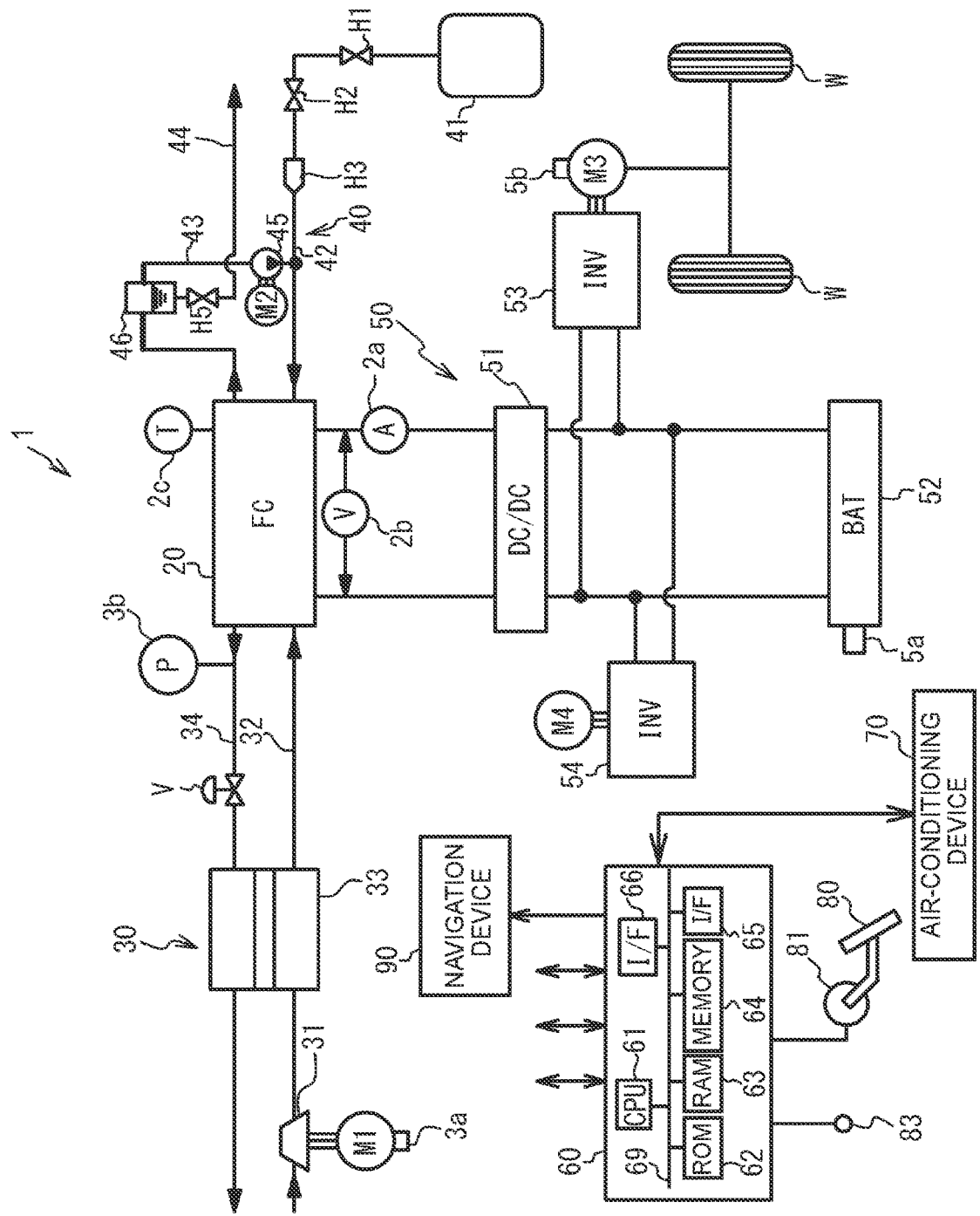
FIG. 1 is a diagram illustrating a configuration of a vehicle.

FIG. 1 is a diagram illustrating a configuration of a fuel-cell vehicle (hereinafter referred to as a vehicle). As illustrated in FIG. 1, the vehicle 1 includes an oxidant gas piping system 30, a fuel gas piping system 40, a power system 50, and a control device 60. The fuel cell 20 is supplied with oxidant gas and fuel gas and generates power. The oxidant gas piping system 30 supplies air containing oxygen as the oxidant gas to the fuel cell 20. The fuel gas piping system 40 supplies hydrogen gas as fuel gas to the fuel cell 20. The power system 50 charges and discharges a system with power. The control device 60 comprehensively controls the vehicle 1 as a whole. The fuel cell 20 is of a solid polymer electrolyte type and has a stacked structure in which a plurality of cells are stacked. A current sensor 2a and a voltage sensor 2b that detect an output current and an output voltage and a temperature sensor 2c that detects a temperature of the fuel cell 20 are attached to the fuel cell 20.

The oxidant gas piping system 30 includes an air compressor 31, an oxidant gas supply passage 32, a humidifier module 33, an oxidant off-gas passage 34, and a motor M1 that drives the air compressor 31. The air compressor 31 is driven by the motor M1, compresses air containing oxygen (oxidant gas) taken from outside air and supplies the compressed air to a cathode of the fuel cell 20. A rotation speed sensor 3a that detects a rotation speed is attached to the motor M1. The oxidant gas supply passage 32 guides air supplied from the air compressor 31 to the cathode of the fuel cell 20. Oxidant off-gas is discharged from the cathode of the fuel cell 20 via the oxidant off-gas passage 34. The humidifier module 33 appropriately humidifies oxidant gas supplied to the fuel cell 20. The oxidant off-gas passage 34 discharges the oxidant off-gas out of the system and a back-pressure control valve V is disposed in the vicinity of a cathode outlet. A pressure sensor 3b that detects a cathode back pressure is attached between the fuel cell 20 and the back-pressure control valve V in the oxidant off-gas passage 34.

The fuel gas piping system 40 includes a fuel gas supply source 41, a fuel gas supply passage 42, a fuel gas circulation passage 43, an anode off-gas passage 44, a hydrogen circulation pump 45, a gas-liquid separator 46, and a motor M2 that drives the hydrogen circulation pump 45. The fuel gas supply source 41 is a tank that supplies hydrogen gas as the fuel gas to the fuel cell 20. The fuel gas supply passage 42 guides fuel gas discharged from the fuel gas supply source 41 to an anode of the fuel cell 20, and a tank valve H1, a hydrogen pressure control valve H2, and an injector H3 are sequentially arranged from an upstream side. The valves and the injector supply fuel gas to the fuel cell 20 or cut off the supply of fuel gas. The fuel gas circulation passage 43 returns unreacted fuel gas to the fuel cell 20, and the gas-liquid separator 46, the hydrogen circulation pump 45, and a check valve which is not illustrated are sequentially arranged from an upstream side. Unreacted fuel gas discharged from the fuel cell 20 is appropriately pressurized by the hydrogen circulation pump 45 and is guided to the fuel gas supply passage 42. An exhaust/drain valve H5 that discharges anode off-gas containing hydrogen off-gas discharged from the fuel cell 20 or water stored in the gas-liquid separator 46 from the system is disposed in the anode off-gas passage 44.

The power system 50 includes a high-voltage DC/DC converter 51, a battery 52, a traction inverter 53, an auxiliary machinery inverter 54, a traction motor M3, and an auxiliary machinery motor M4. The high-voltage DC/DC converter 51 can adjust a DC voltage from the fuel cell 20 and output the adjusted DC voltage to the battery 52. An output voltage of the fuel cell 20 is controlled by the high-voltage DC/DC converter 51. The battery 52 is a secondary battery which is chargeable and dischargeable and can be charged with extra power or can supply auxiliary power. A part of DC power generated in the fuel cell 20 is stepped up/down by the high-voltage DC/DC converter 51 and charges the battery 52. An SOC sensor 5a that detects a state of charge is attached to the battery 52. The traction inverter 53 and the auxiliary machinery inverter 54 convert DC power output from the fuel cell 20 or the battery 52 into three-phase AC power and supply the AC power to the traction motor M3 and the auxiliary machinery motor M4. The traction motor M3 drives wheels W of the vehicle. When the traction motor M3 performs regeneration, output power from the traction motor M3 is converted into DC power via the traction inverter 53 and charges the battery 52. A rotation speed sensor 5b that detects a rotation speed is attached to the traction motor M3.

An air-conditioning device 70 that cools and heats a vehicle interior is mounted in the vehicle 1. Details of the air-conditioning device 70 will be described later.

The control device 60 includes a central processing unit (CPU) 61, a read only memory (ROM) 62, a random access memory (RAM) 63, a memory 64, a network interface 65, and an input/output interface 66, which are connected to each other via a bus 69. The control device 60 comprehensively controls the units of the system based on various sensor signals which are input thereto. Specifically, the CPU 61 of the control device 60 controls power generation of the fuel cell 20 based on sensor signals sent from an accelerator pedal sensor 81 that detects rotation of an accelerator pedal 80, a vehicle speed sensor 83, an SOC sensor 5a, and a rotation speed sensor 5b via the input/output interface 66. The input/output interface 66 is connected to a navigation device 90 or an air-conditioning device 70. A storage unit of the navigation device 90 stores map data, previous traveling history of the vehicle 1, and the like. The navigation device 90 has a global positioning system (GPS) receiver that acquires positional information of the vehicle 1 therein. The CPU 61 of the control device 60 can wirelessly communicate with a server 100 via a network N which will be described later via the network interface 65.

The control device 60 can perform recovery control for recovering output performance of the fuel cell 20 from short-term deterioration of the output performance of the fuel cell 20 due to short-term performance deterioration of a catalyst. The recovery control is performed by a diagnosis unit, a recovery unit, a calculation unit, a determination unit, and an acquisition unit which are functionally realized by the CPU 61, the ROM 62, the RAM 63, and the memory 64 of the control device 60. Accordingly, the control device 60 is an example of an output performance recovering device of the fuel cell 20. The output of the fuel cell 20 in this specification refers to output power generated by power generation of the fuel cell 20.

Figure 2:
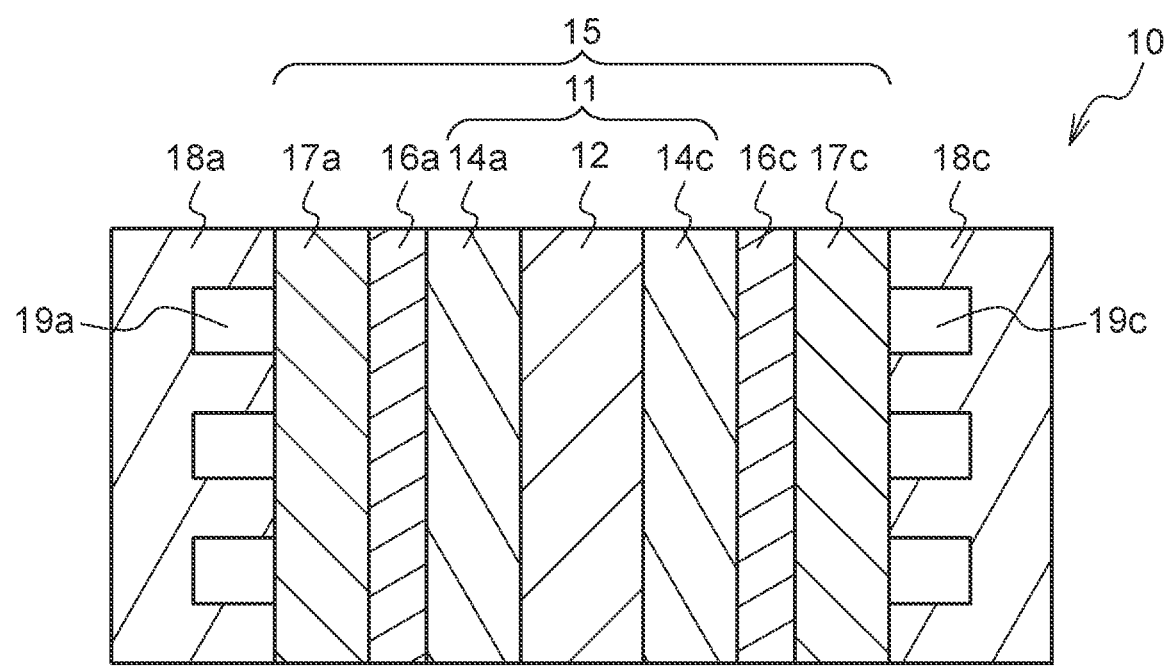
FIG. 2 is a cross-sectional view illustrating a cell of a fuel cell.

A cell 10 of the fuel cell 20 will be described below. FIG. 2 is a cross-sectional view of the cell 10 of the fuel cell 20. The cell 10 includes a membrane electrode assembly (MEA) 11 in which an anode catalyst layer 14a is formed on one surface of an electrolyte membrane 12 and a cathode catalyst layer 14c is formed on the other surface. The electrolyte membrane 12 is a solid polymer membrane and has good proton conductivity in a wet state. The anode catalyst layer 14a and the cathode catalyst layer 14c (hereinafter simply referred to as catalyst layers) includes carbon particles (for example, carbon black) carrying a catalyst (for example, platinum or platinum-cobalt alloy) which causes an electrochemical reaction and ionomers having proton conductivity. An anode water-repellent layer 16a, a cathode water-repellent layer 16c, and an anode gas diffusion layer 17a and a cathode gas diffusion layer 17c which are a pair of diffusion layers are disposed on both sides of the MEA 11. The MEA 11, the pair of water-repellent layers, and the pair of gas diffusion layers are generically referred to as a membrane electrode gas diffusion layer assembly (MEGA) 15. An anode-side separator 18a and a cathode-side separator 18c between which the MEGA 15 is interposed are disposed on both sides of the MEGA 15. The anode-side separator 18a forms an anode gas passage 19a between the anode gas diffusion layer 17a and the anode-side separator 18a. The cathode-side separator 18c forms a cathode gas passage 19c between the cathode gas diffusion layer 17c and the cathode-side separator 18c. A coolant passage in which a coolant flows is formed on a surface of the anode-side separator 18a opposite to the surface on which the anode gas passage 19a is formed and a surface of the cathode-side separator 18c opposite to the surface on which the cathode gas passage 19c is formed. A plurality of cells are stacked in the fuel cell 20.

The above-mentioned short-term deterioration of output performance of the catalyst refers to activity of the catalyst being damaged due to attachment of poisoning materials or oxide coating to the catalyst layers 14a and 14c. Accordingly, the output performance of the fuel cell 20 deteriorates over a short term, but the output performance can be recovered by removing poisoning materials or the oxide coating through the recovery processing. There are various recovery processing, but processing of decreasing an output voltage of the fuel cell 20 and mainly promoting removal of oxide coats by stopping supply of oxidant gas to the fuel cell 20 and realizing low-efficiency power generation (hereinafter referred to as recovery processing A) is performed in this embodiment.

Here, by repeatedly performing recovery processing A, oxidation and reduction of platinum of the catalyst layers 14a and 14c are repeated such that some of the platinum dissolves, and thus performance of the catalyst layers 14a and 14c deteriorates over a long term, and there is a likelihood that the output performance of the fuel cell 20 will deteriorate over a long term. Accordingly, it is preferable that an execution frequency of recovery processing A be as small as possible. Accordingly, although details thereof will be described later, the control device 60 calculates a predicted output value of the fuel cell 20 based on information stored in the server 100 and determines whether to execute recovery processing A based on the predicted output value of the fuel cell 20.

Figure 3:
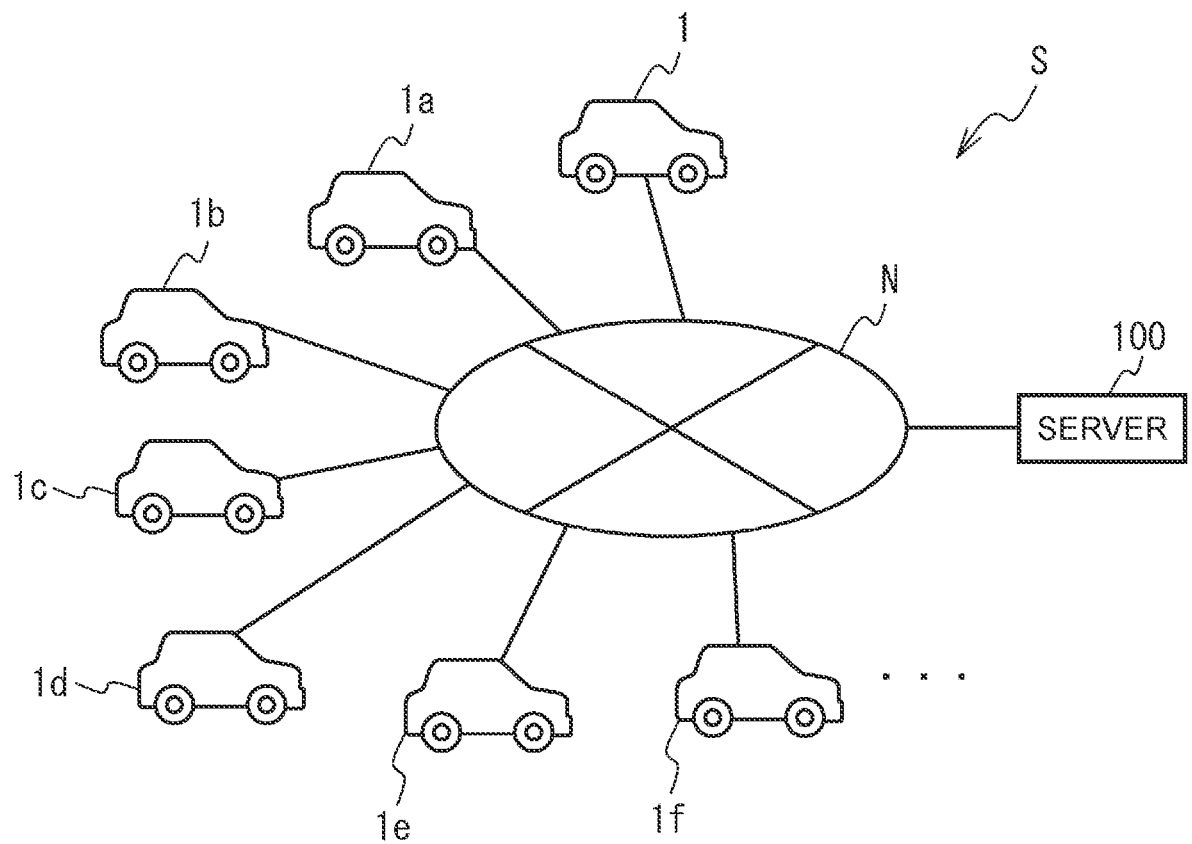
FIG. 3 is a diagram illustrating a configuration of an output performance recovering system.

FIG. 3 is a diagram illustrating a configuration of an output performance recovering system S. The output performance recovering system S is an example of an output performance recovering system for the fuel cell 20. In the output performance recovering system S, a vehicle group and a server 100 are connected to a network N such as the Internet. Specifically, control devices which are mounted in vehicles 1, 1a, 1b, 1c, 1d, 1e, 1f, . . . are connected to the network N. Here, the vehicles 1a to 1f other than the vehicle 1 are, for example, a vehicle group of engine vehicles, hybrid vehicles, electric vehicles, fuel-cell vehicles, and the like. Positional information and vehicle speeds of the vehicles 1 to 1f in correlation with each other are wirelessly transmitted to the server 100 from the control devices of the vehicles 1 to 1f via the network N.

Figures 4A, 4B:
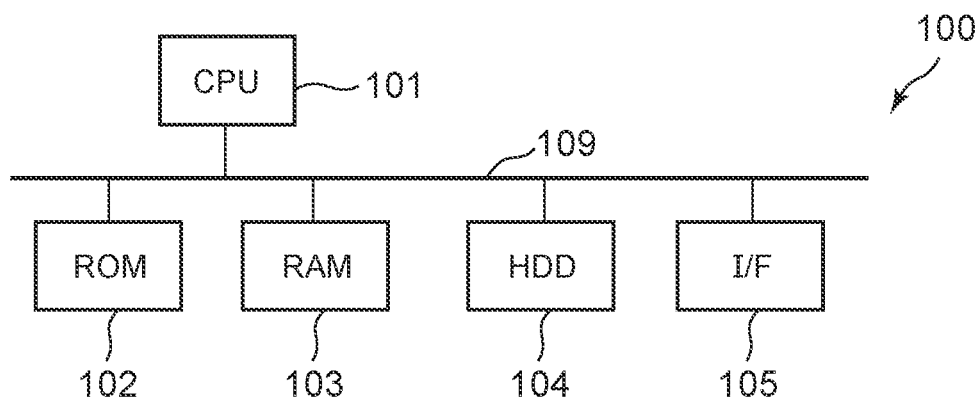
FIG. 4A is a diagram illustrating a configuration of a server.
FIG. 4B is a diagram illustrating an example of an average vehicle speed which is stored in an HDD of the server.

The server 100 will be described below. FIG. 4A is a diagram illustrating a configuration of the server 100. The server 100 includes a CPU 101, a ROM 102, a RAM 103, a hard disk drive (HDD) 104, and a network interface 105, which are connected to each other via a bus 109. In the server 100, various functions are embodied by causing the CPU 101 to execute programs stored in the ROM 102 or the HDD 104. The network interface 105 can communicate with the control device 60 of the vehicle 1 and can also communicate with the control devices of the vehicles 1a to 1f other than the vehicle 1. The HDD 104 stores positional information and vehicle speed information of the vehicles acquired from the vehicle group and an average vehicle speed at each point. So long as such information can be stored and held, the invention is not limited to the HDD 104 but may employ other storage devices. Here, an average vehicle speed is an average value of traveling speeds of the vehicle group when the vehicle group including the vehicles 1 to 1f is traveling at a point. FIG. 4B illustrates an example of average vehicles stored in the HDD 104. In FIG. 4B, an average vehicle speed is calculated for each of points A1, A2, A3, A4, . . . , B1, B2, B3, B4, . . . , C1, C2, C3, C4, . . . .

Figure 5A:
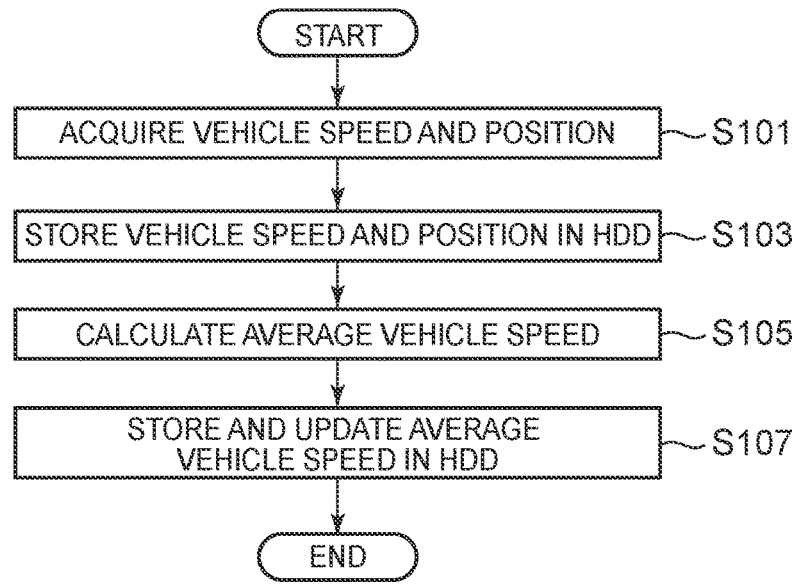
FIG. 5A is a flowchart illustrating an example of control for calculating an average vehicle speed.

Control for calculating an average vehicle speed which is performed by the server 100 will be described below. FIG. 5A is a flowchart illustrating an example of control for calculating an average vehicle speed. This control is repeatedly performed in a predetermined cycle. First, current locations of a plurality of vehicles and vehicle speeds at the locations are acquired from the vehicles via the network N (Step S101). A current location of a vehicle is acquired, for example, based on positional information from GPS receivers mounted in the vehicles. The vehicle speeds of the vehicles are acquired from vehicle speed sensors mounted in the vehicles. Then, the acquired locations and the acquired vehicle speeds are stored in the HDD 104 in correlation with each other (Step S103). Then, an average vehicle speed which is an average value of the vehicle speeds is calculated based on a plurality of vehicle speeds acquired for the same point (Step S105). The calculated average vehicle speed is stored and updated in the HDD 104 in correlation with the points (Step S107). Accordingly, the average vehicle speed at each point is an average vehicle speed of a vehicle group including the vehicle 1 when the vehicle 1 has traveled through the point, and is an average vehicle speed of a vehicle group not including the vehicle 1 when the vehicle 1 has never traveled through the point.

Figure 5B:
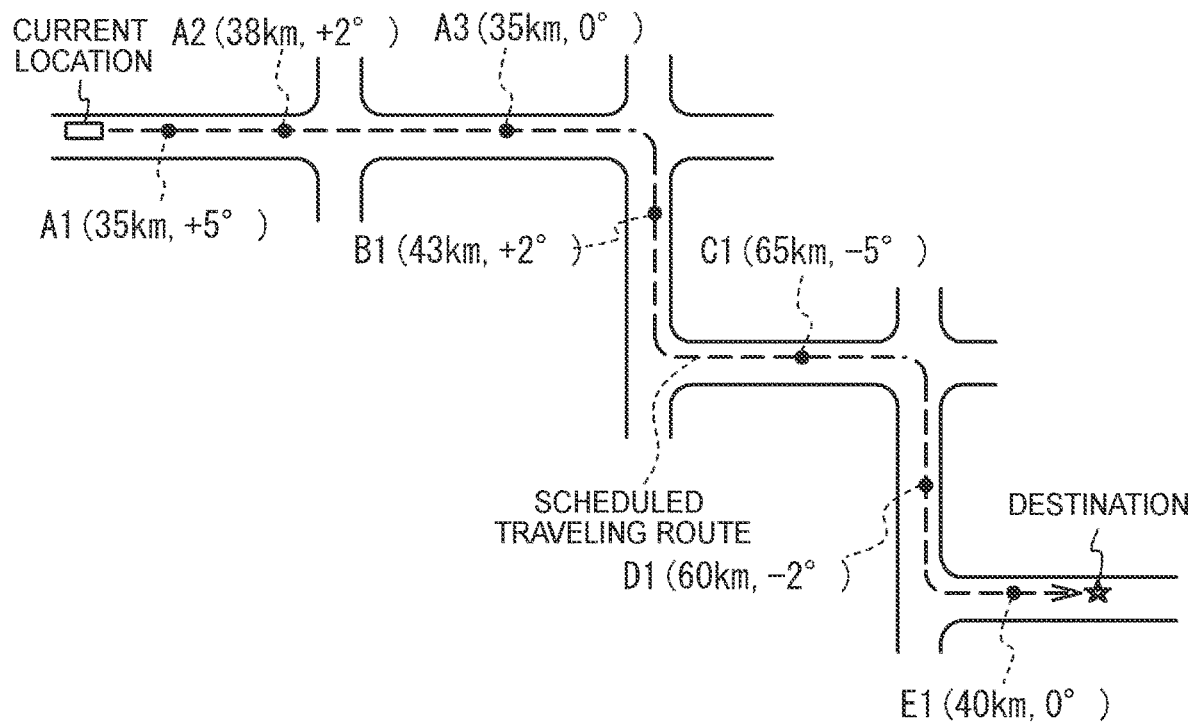
FIG. 5B is a conceptual diagram illustrating an average vehicle speed and a gradient at each point on a scheduled traveling route.

Control which is performed by the control device 60 of the vehicle 1 will be described below. The control device 60 of the vehicle 1 acquires the average vehicle speed at each point on a scheduled traveling route from a current location of the vehicle 1 to a destination from the server 100. The scheduled traveling route is a route for guiding the vehicle 1 from a current location of the vehicle 1 to a destination set in the navigation device 90 by a user using the navigation device 90 or a route which is estimated from a previous traveling history stored in the navigation device 90 when a destination is not set. The control device 60 acquires the scheduled traveling route from the navigation device 90. The control device 60 acquires a gradient of a road at each point on the scheduled traveling route from which the average vehicle speed has been acquired from the map data stored in the navigation device 90. FIG. 5B is a conceptual diagram illustrating average vehicle speeds and gradients at points A1 to A3, B1, C1, D1, and E1 on the scheduled traveling route. The control device 60 calculates a predicted output value of the fuel cell 20 on the scheduled traveling route based on the average vehicle speed and the gradient at each point, and determines whether to execute recovery processing A depending on the calculation result.

Figure 6:
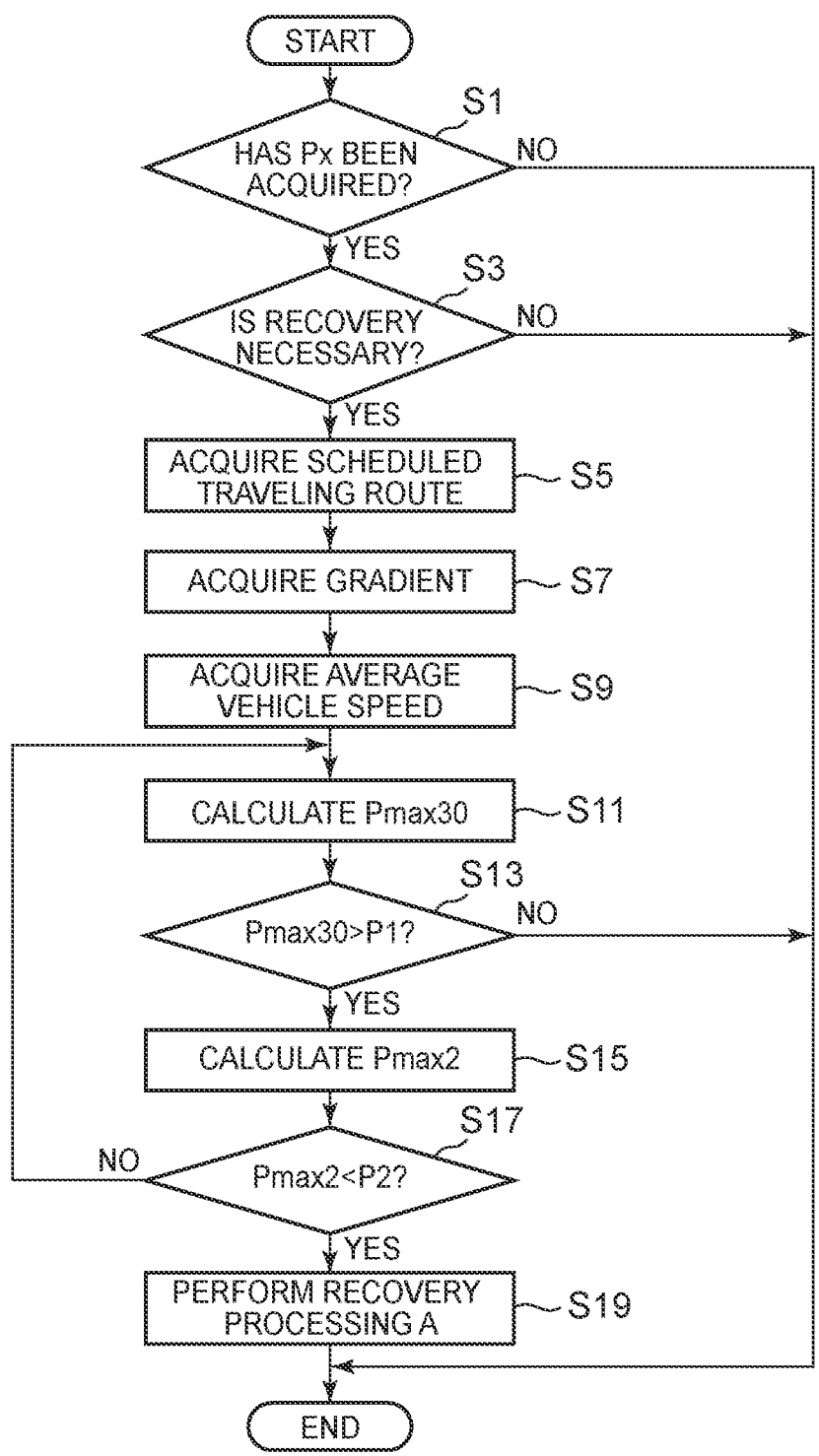
FIG. 6 is a flowchart illustrating an example of recovery control according to an embodiment.

Recovery control which is performed by the control device 60 will be specifically described below. FIG. 6 is a flowchart illustrating an example of recovery control according to this embodiment. The recovery control is repeatedly performed in a predetermined cycle. First, it is determined whether an output value Px of the fuel cell 20 at a predetermined operating state has been acquired (Step S1). The recovery control is ended when the determination result is negative, and it is determined whether it is necessary to recover the catalyst of the fuel cell 20 from short-term performance deterioration based on the output value Px when the determination result is positive (Step S3). Specifically, the determination result of Step S3 is positive when the output value Px is less than a threshold value P0, and the determination result of Step S3 is negative when the output value Px is equal to or greater than the threshold value P0.

Here, the predetermined operating state is a state which is suitable for determining whether it is necessary to recover the catalyst of the fuel cell 20 from short-term performance deterioration. Specifically, the predetermined operating state is a state in which the output of the fuel cell 20 is relatively small and is a state in which the current density is 0.2 A/cm$^2$, the temperature of the fuel cell 20 is 60° C., and the stoichiometric ratios of the anode side and the cathode side are 1.5. The output value Px is acquired based on measured values of the current sensor 2a and the voltage sensor 2b in the predetermined operating state and is stored in the memory 64 of the control device 60. The threshold value P0 is a threshold value for determining whether it is necessary to recover the catalyst of the fuel cell 20 from short-term performance deterioration in the predetermined operating state. When the output value Px is less than the threshold value P0, it can be determined that the output performance of the fuel cell 20 deteriorates and short-term performance deterioration of the catalyst progresses. When the output value Px is equal to or greater than the threshold value P0, it can be determined that the output performance of the fuel cell 20 is secured and short-term performance deterioration of the catalyst does not progress. The threshold value P0 may vary depending on a degree of performance deterioration of the fuel cell 20 which is irrecoverable. For example, a map in which the threshold value P0 increases as a traveling distance of the vehicle 1, an operating time of the fuel cell 20, or the like increases may be stored in the ROM in advance and the threshold value P0 may be determined with reference to the map. Irrecoverable performance deterioration of the fuel cell may be calculated based on the output of the fuel cell 20 after recovery processing A of the fuel cell 20 ends, and the threshold value P0 may be updated based thereon.

Accordingly, when the determination result of Step S3 is negative, recovery processing A is not performed and the routine ends. That is, it is determined that it is not necessary to recover the catalyst from short-term performance deterioration and recovery processing A is not performed. Accordingly, it is possible to minimize an execution frequency of recovery processing A and to minimize long-term deterioration of the output performance of the fuel cell 20. When the determination result of Step S3 is positive, it is determined that the output performance of the fuel cell 20 deteriorates due to the short-term performance deterioration of the catalyst. The process of Step S3 is not limited to the above-mentioned process, but it may be determined whether an output voltage of the fuel cell 20 in a predetermined state is less than a threshold value or it may be determined whether an output current or output power of the fuel cell 20 in a state in which the output voltage of the fuel cell 20 reaches a predetermined value is less than a threshold value. The process of Step S3 is not limited to the above-mentioned process, as long as it can be determined whether it is necessary to recover the catalyst of the fuel cell 20 from short-term performance deterioration. The process of Step S3 is an example of a process which is performed by the diagnosis unit that determines whether it is necessary to recover the catalyst of the fuel cell 20 from short-term performance deterioration.

When the determination result of Step S3 is positive, a scheduled traveling route is acquired from the navigation device 90 as described above (Step S5). Then, a gradient of each point on the scheduled traveling route is acquired from map data of the navigation device 90 (Step S7). Then, an average vehicle speed at each point of the scheduled traveling route is acquired from the server 100 (Step S9). The average vehicle speed is acquired as an example of a predicted vehicle speed of the vehicle 1 that travels on the scheduled traveling route. The process of Step S9 is an example of a process which is performed by the acquisition unit that acquires a predicted vehicle speed or an average vehicle speed from the server 100.

Then, a maximum value Pmax30 of a predicted output value which is predicted to be output from the fuel cell 20 in a predetermined time, specifically, 30 minutes, from a current time point is calculated based on the gradient and the average vehicle speed at each point on the scheduled traveling route (Step S11). The maximum value Pmax30 is a maximum value of the predicted output value of the fuel cell 20 at each point up to a point at which the vehicle is predicted to arrive in 30 minutes from the current location and is an example of a parameter correlated with the predicted output value of the fuel cell 20.

Figure 7:
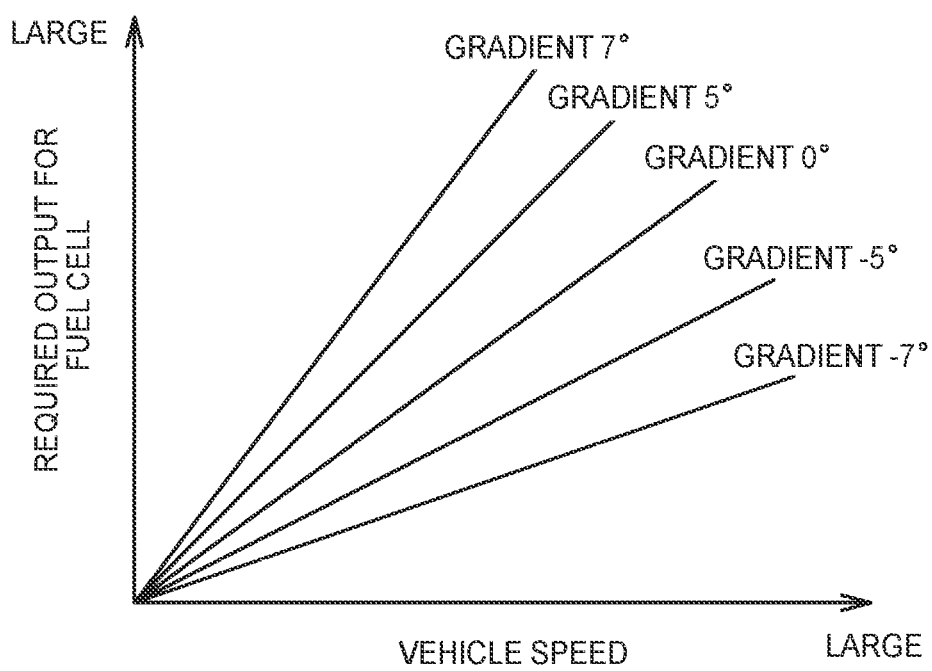
FIG. 7 is a map in which a required output for a fuel cell is defined for each vehicle speed and each gradient.

The predicted output value of the fuel cell 20 can be regarded to be substantially the same as a required output at a predetermined point with a predetermined gradient which is required for the fuel cell 20 to realize traveling of the vehicle 1 at the average vehicle speed at the point. Specifically, the predicted output value of the fuel cell 20 can be regarded to be substantially the same as a power value which is consumed by the traction motor M3, the auxiliary machinery motor M4, and the like and which is required for realizing the above-mentioned traveling. FIG. 7 is a map in which the required output for the fuel cell 20 is defined for each vehicle speed and for each gradient. The map is calculated by experiment in advance and is stored in the memory 64 of the control device 60 in advance. The required output for the fuel cell 20 increases as the vehicle speed increases, increases as an uphill gradient increases, and decreases as a downhill gradient increases. With reference to the map, the predicted output value of the fuel cell 20 at each point on the scheduled traveling route is calculated and the maximum value Pmax30 is calculated based on the calculated predicted output value at each point. The process of Step S11 is an example of a process which is performed by the calculation unit that calculates a parameter correlated with the predicted output value of the fuel cell 20, which is predicted to be output on the scheduled traveling route, based on the predicted vehicle speed on the scheduled traveling route of the vehicle 1 which travels with the fuel cell 20.

Then, it is determined whether the maximum value Pmax30 is greater than a threshold value P1 (Step S13). The threshold value P1 is a value which is used to determine whether a high output with which the fuel cell 20 cannot cope is required when recovery processing A is not performed in a state in which output performance deteriorates over a short term due to the short-term performance deterioration of the catalyst. When the determination result is positive, it can be determined that a high output is required for the fuel cell 20 in a period in 30 minutes from a current time point. When the determination result is negative, it can be determined that a high output is not required for the fuel cell 20 in a period in 30 minutes from a current time point. The process of Step S13 is an example of a process which is performed by the determination unit that determines whether the parameter is greater than a first threshold value. The threshold value P1 is an example of the first threshold value.

When the determination result of Step S13 is positive, a maximum value Pmax2 of the predicted output value of the fuel cell 20 in a predetermined time, specifically, two minutes, from the current time point is calculated (Step S15). Then, it is determined whether the maximum value Pmax2 is less than a threshold value P2 (Step S17). The process of Step S17 is a process for determining whether the predicted output value of the fuel cell 20 in a relatively near future in two minutes from the current time point is small enough to perform recovery processing A. Since recovery processing A is a process of stopping supply of oxidant gas and realizing low-efficiency power generation, there is a likelihood that performing of recovery processing A while a high output is required can has an influence on drivability. When the determination result of Step S17 is positive, it is determined that the predicted output value is suitable for performing recovery processing A and recovery processing A is performed (Step S19). Accordingly, it is possible to minimize an influence of recovery processing A on drivability. When the determination result of Step S17 is negative, the processes of Step S11 and steps subsequent thereto are repeatedly performed until the operating state of the fuel cell 20 is predicted to be suitable for performing recovery processing A.

When it is predicted in Step S13 that a high output is required for the fuel cell 20, recovery processing A is performed and thus it is possible to recover output performance of the fuel cell 20 before a high output is actually required and to cope with requirement for a high output which is predicted thereafter. The process of Step S19 is an example of a process which is performed by the recovery unit that performs recovery processing for controlling the voltage of the fuel cell 20 and recovering the catalyst from short-term performance deterioration.

The maximum value Pmax30 in a period of 30 minutes from the current time point is calculated in Step S11 and the maximum value Pmax2 in a period in two minutes from the current time point is calculated in Step S15, but the invention is not limited to these periods. The period in Step S15 has only to be included in the period in Step S11.

When the determination result of Step S13 is negative, recovery processing A is not performed and the routine ends. That is, when the maximum value Pmax30 is not relatively large even if it is determined in Step S3 that it is necessary to recover the catalyst from short-term performance deterioration, recovery processing A is not performed. In this case, this is because the output required for the fuel cell 20 is predicted to be small and it is possible to cope with the required output without performing recovery processing A. Accordingly, it is possible to minimize an execution frequency of recovery processing A and to minimize long-term deterioration of the output performance of the fuel cell 20. In the recovery control according to this embodiment, the output value Px which is used for the determination of Step S1 is erased from the memory 64 of the control device 60 after recovery processing A has been performed.

Figure 8A:
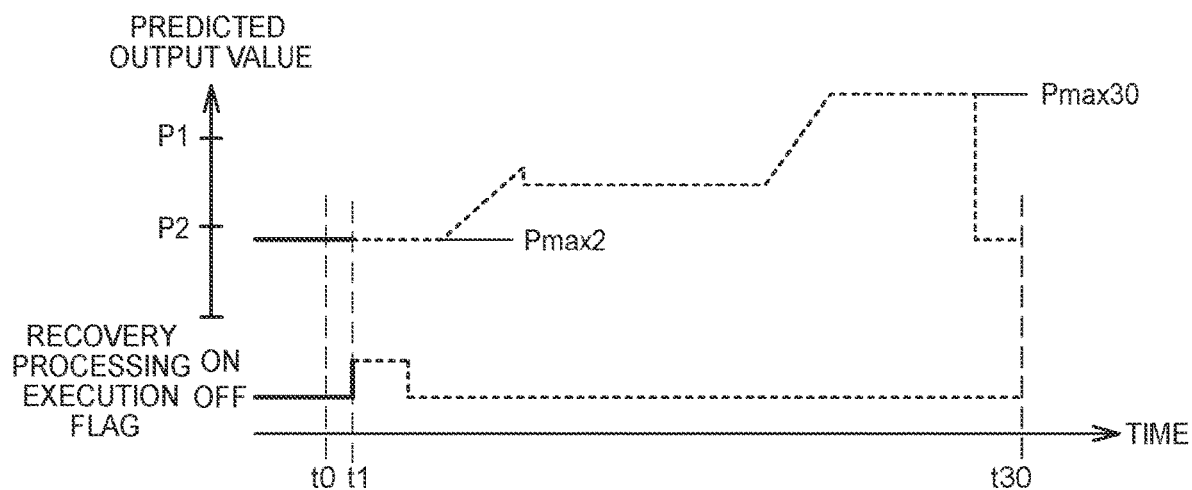
FIG. 8A is a timing chart illustrating an example of change of a predicted output value and ON/OFF of a recovery processing execution flag when recovery processing is performed.
Figure 8B:
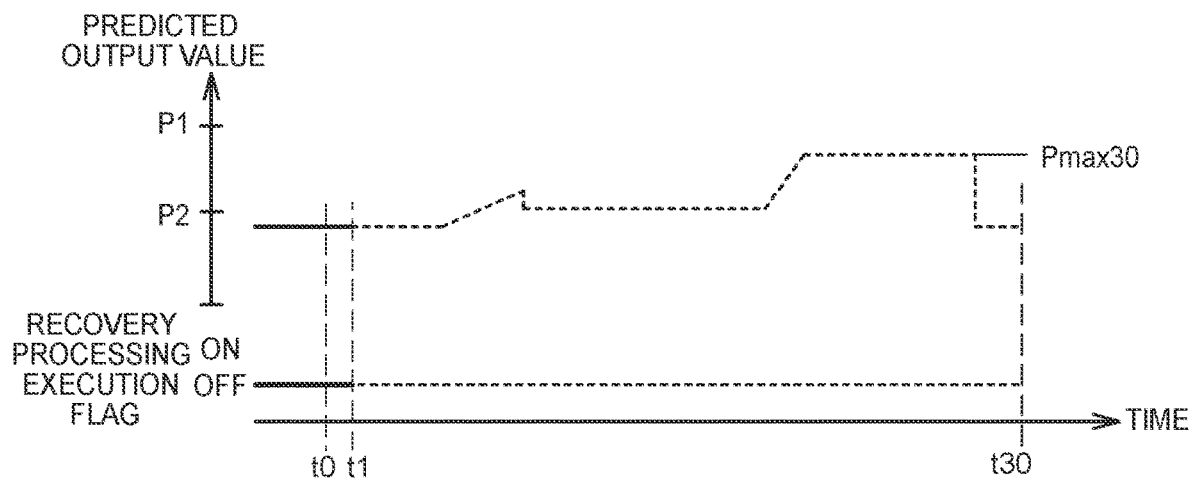
FIG. 8B is a timing chart illustrating an example of change of a predicted output value and ON/OFF of a recovery processing execution flag when recovery processing is not performed.

FIGS. 8A and 8B are timing charts illustrating a change of the predicted output value and ON/OFF of an execution flag of the recovery processing when recovery processing A is performed and when recovery processing A is not performed. Time t1 denotes a current time point, time t0 denotes a previous time point, and time t30 denotes a time point at which 30 minutes elapses from time t0. In FIGS. 8A and 8B, an example in which the maximum value Pmax30 is calculated at time t0 and the determination of Step S17 is performed at time t1 when the determination result of Step S3 is positive is illustrated. In the output values in FIGS. 8A and 8B, a solid line part indicates an output of the fuel cell 20 from the past to time t1, and a dotted line part indicates a predicted output value from time t1 to time t30. In a recovery processing execution flag, a solid line part indicates a flag state from the past to time t1, and a dotted line part indicates a flag state from time t1 to time t30. In FIG. 8A, the maximum value Pmax2 from time t1 to a time point after two minutes elapses is illustrated.

In FIG. 8A, since the maximum value Pmax30 from time t0 to time t30 is greater than the threshold value P1 and the maximum value Pmax2 in two minutes from the current time point t1 is less than the threshold value P2, the recovery processing execution flag is switched from OFF to ON. On the other hand, in FIG. 8B, when the maximum value Pmax30 is equal to or less than the threshold value p1 and the determination result of Step S3 is positive, recovery processing A is not performed. As described above, since recovery processing A is performed only when it is necessary at most, it is possible to cope with requirement for a high output to the fuel cell 20 and to minimize long-term deterioration of the output performance of the fuel cell 20. According to the above-mentioned method, since the predicted output value of the fuel cell 20 can be accurately calculated based on the average vehicle speed acquired from the server 100, it is possible to further appropriately determine whether it is necessary to perform recovery processing A based on the predicted output value.

In the above-mentioned embodiment, the maximum value of the predicted output value in a predetermined period in a predetermined time from the current time point is used in Steps S11 and S13, but the invention is not limited thereto. For example, it may be determined whether the average value of the predicted output value in a predetermined period may be greater than a predetermined threshold value. It may be determined whether an accumulated time in which the predicted output value in the predetermined period is greater than the threshold value is greater than a predetermined time. It may be determined whether a size of an area which is surrounded by a locus of the predicted output value in a range in which the locus of the predicted output value in a predetermined period is greater than a line segment indicating a predetermined output value and the line segment is greater than a predetermined threshold value. The maximum value, the average value, the accumulated time, and the area increase as the predicted output value of the fuel cell 20 increases, and are an example of the parameter correlated with the predicted output value. The same is true of Steps S15 and S17.

In the above-mentioned embodiment, the average vehicle speed acquired from the server 100 is used as an example of the predicted vehicle speed, but the invention is not limited thereto. For example, the predicted vehicle speed may be an average vehicle speed of a vehicle group into which all vehicles are classified with a predetermined criterion, instead of the average vehicle speed of all the vehicles which have traveled on the scheduled traveling route. For example, an average vehicle speed of a vehicle group corresponding to the vehicle 1 among a vehicle group with a high frequency in which an acceleration is equal to or higher than a predetermined value in a section of a predetermined traveling distance and a vehicle group with a low frequency may be used as the predicted vehicle speed of the vehicle 1. In this case, the server 100 classifies the vehicles into the vehicle group with a high frequency and the vehicle group with a low frequency based on the identification information and the accelerations transmitted from the vehicles 1 to 1ƒ from time to time, and calculates and stores the average vehicle speeds of the vehicle groups in the HDD 104. The control device 60 of the vehicle 1 acquires the average vehicle speed of the vehicle group corresponding to the vehicle 1 from the HDD 104 with reference to the identification information of the vehicle 1 and the identification information stored in the HDD 104. Accordingly, it is possible to acquire the predicted vehicle speed of the vehicle 1 in consideration of driving habit of a driver of the vehicle 1 and to further accurately calculate the predicted output value of the fuel cell 20. Similarly, an average vehicle speed of a vehicle group corresponding to the vehicle 1 among a vehicle group with a high frequency in which the vehicle speed is higher than a threshold value correlated with a speed limit at each point and a vehicle group with a low frequency may be used as the predicted vehicle speed of the vehicle 1. In this case, the server 100 classifies vehicles into the vehicle group with a high frequency and the vehicle group with a low frequency based on the identification information from the vehicles 1 to 1ƒ and the difference between the vehicle speed at each point and the threshold value correlated with the speed limit, and calculates and stores the average vehicle speeds of the vehicle groups in the HDD 104. The control device 60 of the vehicle 1 acquires the average vehicle speed of the vehicle group corresponding to the vehicle 1 from the HDD 104 with reference to the identification information of the vehicle 1 and the identification information stored in the HDD 104. Examples of the identification information of the vehicle include a registered number described in a number plate, a frame number, and a serial number of the fuel cell in case of a fuel-cell vehicle.

The newest average vehicle speed stored in the server 100 is used as an example of the predicted vehicle speed of the vehicle 1, but the invention is not limited thereto and, for example, a previous average vehicle speed may be used. As the previous average vehicle speed, for example, an average vehicle speed at the same time of the previous day may be used or an average vehicle speed on the same day of the last week may be used. In this case, the server 100 stores a position, a vehicle speed, and a date and time transmitted from each vehicle in correlation with each other in the HDD 104, calculates an average vehicle speed at each point for each date and time, and stores the calculated average vehicle speed in the HDD 104. That is, information on the average vehicle speed illustrated in FIG. 4B is stored in the HDD 104 for each date and time.

The predicted vehicle speed of the vehicle 1 may be calculated based on the average vehicle speeds stored in the server 100 and the vehicle speed of the vehicle 1. For example, when a speed difference obtained by subtracting the average vehicle speed stored in the server 100 from the actual vehicle speed of the vehicle 1 in a predetermined traveling section is a positive value equal to or greater than a predetermined value, a value obtained by multiplying the average vehicle speed by a coefficient m (m>1) may be set as the predicted vehicle speed, and when the speed difference has a negative value and the absolute value of the speed difference is equal to or greater than a predetermined value, a value obtained by multiplying the average vehicle speed by a coefficient l (0<l<1) may be set as the predicted vehicle speed. In this case, the control device 60 of the vehicle 1 may store the actual vehicle speed of the vehicle 1 in a predetermined traveling section and may calculate the predicted vehicle speed based on the actual vehicle speed and the average vehicle speed acquired from the server 100. The control device 60 of the vehicle 1 may transmit the actual vehicle speed of the vehicle 1 to the server 100 and the server 100 may calculate the predicted vehicle speed based on the actual vehicle speed and the average vehicle speed and may transmit the calculated predicted vehicle speed to the control device 60.

When an average vehicle speed at a certain point on the scheduled traveling route of the vehicle 1 which is stored in the server 100 is based on only the vehicle speed of a single vehicle, the vehicle speed of the single vehicle is used as the predicted vehicle speed of the vehicle 1. In this case, the vehicle speed stored in the server 100 may be a vehicle speed when the vehicle 1 traveled in the past or may be a vehicle speed of another vehicle.

The predicted vehicle speed of the vehicle 1 may be a vehicle speed when the vehicle 1 actually traveled on the scheduled traveling route in the past, which is stored in the server 100. In this case, the server 100 stores identification information, a position, and a vehicle speed of each vehicle in the HDD 104 from time to time. The control device 60 of the vehicle 1 acquires the vehicle speed on the scheduled traveling route of the vehicle 1 from the HDD 104 with reference to the identification information of the vehicle 1 and the identification information stored in the HDD 104 and uses the acquired vehicle speed as the predicted vehicle speed of the vehicle 1. The predicted vehicle speed of the vehicle 1 may be a vehicle speed in the same time zone at each point on the scheduled traveling route on which the vehicle 1 traveled in the past. In this case, the server 100 stores the identification information from time to time, the position, and the vehicle speed transmitted from each vehicle and the date and time in the HDD 104 in correlation with each other.

A speed limit at each point of the map data stored in advance in the navigation device 90 or a speed limit at each point stored in advance in the HDD 104 of the server 100 may be used as the predicted vehicle speed of the vehicle 1. The speed limit stored in the navigation device 90 may be corrected by adding congestion information which can be acquired by the navigation device 90 to the speed limit. In this case, a value obtained by multiplying the speed limit by a correction value based on a past traveling history of the a driver stored in the navigation device 90 or the like may be used as the predicted vehicle speed of the vehicle 1. The gradient of each point may be acquired from the server 100, when the gradients are stored in the HDD 104 of the server 100 in advance.

In the above-mentioned embodiment, the control device 60 acquires the scheduled traveling route from the navigation device 90 which is mounted in the vehicle 1, but the invention is not limited thereto. For example, when a previous traveling route of the vehicle 1 is stored in the HDD 104 of the server 100, the control device 60 may acquire the previous traveling route as the scheduled traveling route. In this case, the server 100 stores a route from a departure to a destination on which each vehicle has traveled as a traveled route in the HDD 104 in correlation with the identification information and the position of the vehicle. The control device 60 acquires the traveled route of the vehicle 1 from the HDD 104 with reference to the identification information of the vehicle 1 and the identification information stored in the HDD 104, sets the destination of the traveled route as a destination of the current traveling when the current location of the vehicle 1 is included in the traveled route, and acquires a route from the current location to the destination as the scheduled traveling route.

In the above-mentioned embodiment, the predicted output value of the fuel cell 20 is regarded to be substantially the same as the required output required for the fuel cell 20 based on the gradient and the vehicle speed, but the invention is not limited thereto. For example, in consideration of an output of a battery 52 for compensating for the output of the fuel cell 20, a value obtained by subtracting a predetermined value corresponding to the compensation output of the battery 52 from the required output required for the fuel cell 20 based on the gradient and the vehicle speed may be used as the predicted output value of the fuel cell 20. In consideration of the output of the battery 52 for compensating for the output of the fuel cell 20, a value obtained by multiplying the predicted output value of the vehicle 1 by a predetermined coefficient k (0<k<1) may be used as the predicted output value of the fuel cell 20.

In the above-mentioned embodiment, the predicted output value of the fuel cell 20 is calculated based on the gradient and the predicted vehicle speed, but may be calculated based on only the predicted vehicle speed. In a range in which a driver generally drives a vehicle, this is because a gradient of a road is small or an average value of the gradient is often close to zero, and thus it is conceived that an influence of the vehicle speed predominates.

The recovery control illustrated in FIG. 6 may be performed in cooperation by the control device 60 of the vehicle 1 and the server 100. For example, the control device 60 of the vehicle 1 may perform the processes of steps S1, S3, and S19 and the server 100 may perform the processes of Steps S5 to S17. In this case, when the determination results of Steps S13 and S17 are positive, the server 100 transmits an execution command of recovery processing A to the control device 60 of the vehicle 1 and the control device 60 performs recovery processing A. The server 100 may perform the processes of Steps S1 to S17 and the control device 60 of the vehicle 1 may perform the process of Step S19. In this case, in order to cause the server 100 to perform the processes of Steps S1 and S3 and the like, the control device 60 of the vehicle 1 transmits information on the operating state of the fuel cell 20 such as the output voltage, the output current, or the output power of the fuel cell 20 or the stoichiometric ratios of the cathode side and the anode side to the server 100 from time to time.

In the above-mentioned embodiment, the predicted output value of the fuel cell 20 may be calculated in consideration of an output of the fuel cell 20 which is consumed by an air-conditioning device 70. A configuration of the air-conditioning device 70 will be described before describing such an example in detail.

Figure 9B:
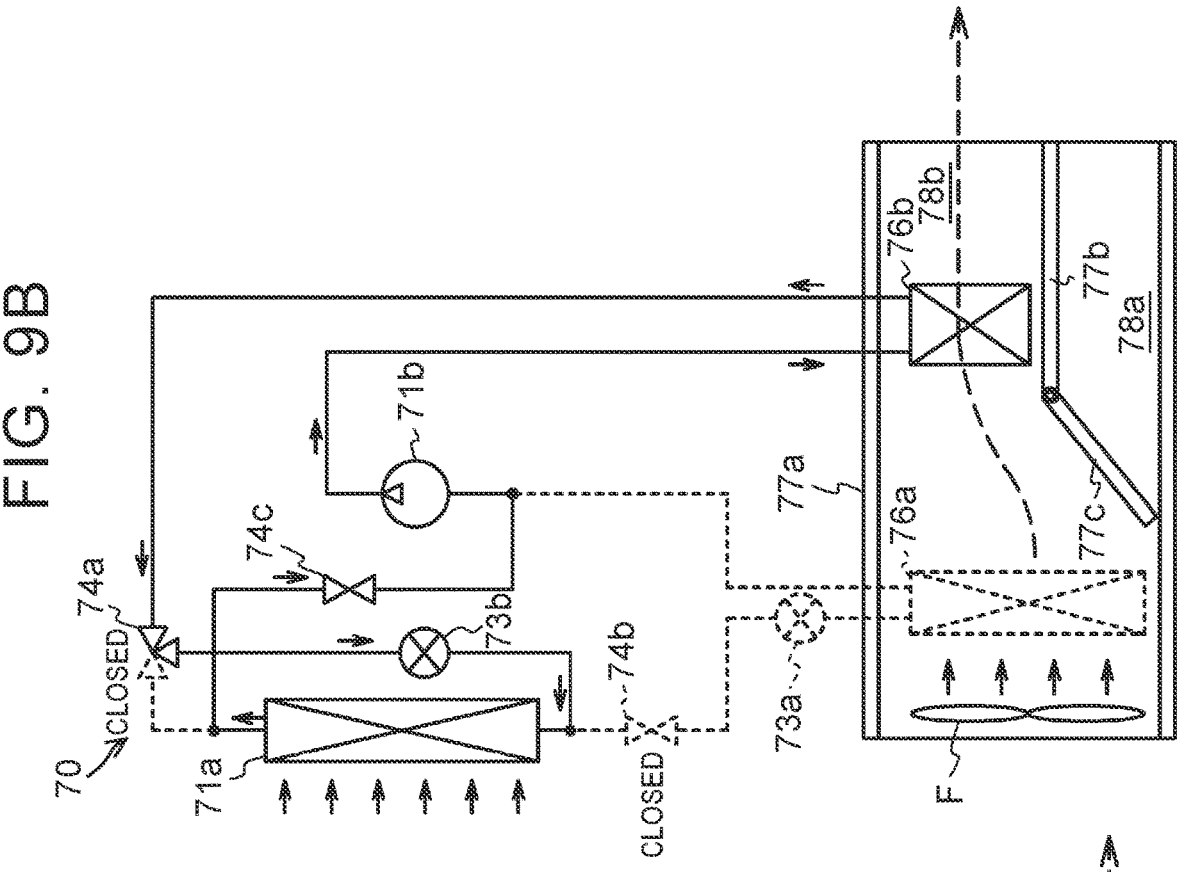
FIG. 9B is a diagram illustrating a state of the air-conditioning device at the time of heating.
Figure 9A:
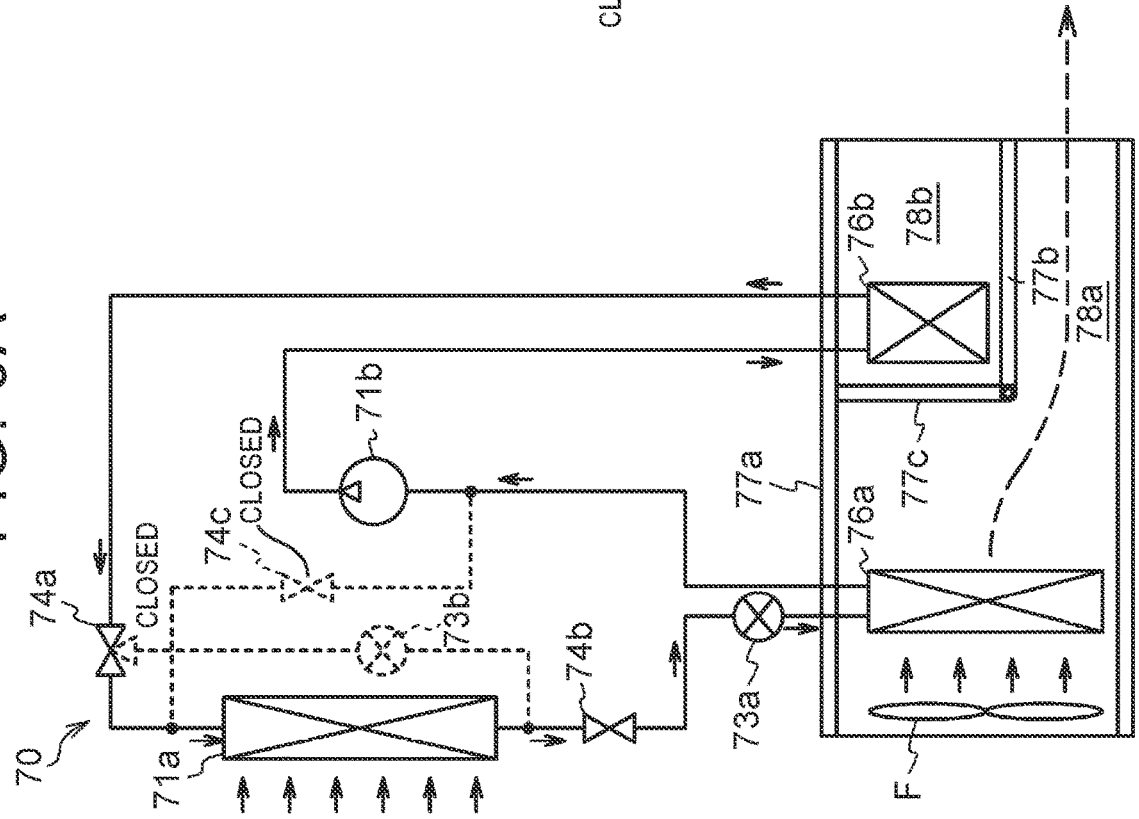
FIG. 9A is a diagram illustrating a state of an air-conditioning device at the time of cooling.

FIGS. 9A and 9B illustrate states of the air-conditioning device 70 at the time of cooling and at the time of heating. The air-conditioning device 70 includes an air-conditioning compressor 71*b*, an evaporator 76*a*, and an indoor condenser 76*b*, which are connected to each other via pipe in which a refrigerant flows. At the time of cooling, ON/OFF states of a three-way valve 74*a* and ON/OFF valves 74*b* and 74*c* are controlled such that a refrigerant circulates as follows. As illustrated in FIG. 9A, a refrigerant in a gas phase is condensed by the air-conditioning compressor 71*b*, passes through the indoor condenser 76*b* and the three-way valve 74*a* in a high-temperature and high-pressure state, is cooled into a liquid phase by heat exchange with outside air in an outdoor heat exchanger 71*a*, and is sprayed to the evaporator 76*a* by an expansion valve 73*a*, and is vaporized. At this time, the refrigerant exchanges heat with air blown from a fan F. The heat-exchanged cold air is sent to a vehicle interior via a duct 77*a* communicating with the vehicle interior in a state in which a shutter 77*c* is separated by a partition wall 77*b* to open a cooling air passage 78*a* and to close a heating air passage 78*b*.

At the time of heating, the ON/OFF states of the three-way valve 74*a* and the ON/OFF valves 74*b* and 74*c* are controlled such that a refrigerant circulates as follows. As illustrated in FIG. 9B, a refrigerant in a gas phase is condensed by the air-conditioning compressor 71*b* and exchanges heat with air flown from the fan F in the indoor condenser 76*b* in a high-temperature and high-pressure state. The heat-exchanged warm air is sent to the vehicle interior in a state in which the shutter 77*c* closes the air passage 78*a* and opens the air passage 78*b*. The refrigerant liquefied by the indoor condenser 76*b* passes the three-way valve 74*a*, is changed into a fog state by the expansion valve 73*b*, flows into the outdoor heat exchanger 71*a*, and exchanged heat with outside air at the time of being vaporized in the outdoor heat exchanger 71*a*. The vaporized refrigerant is condensed again by the air-conditioning compressor 71*b*.

Figure 10:
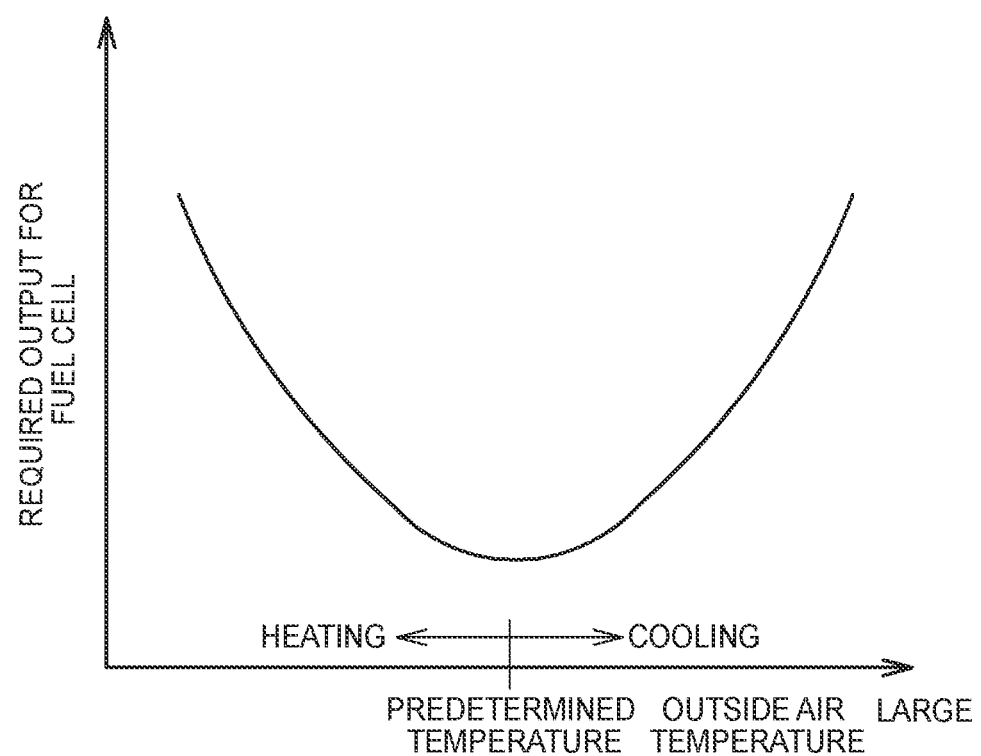
FIG. 10 is a map in which an output required for a fuel cell by an air-conditioning device and an outside air temperature are defined.

The control device 60 calculates a value, which is obtained by adding a required output required for the fuel cell 20 by the air-conditioning device 70 to the required output for the fuel cell 20 based on the gradient and the vehicle speed illustrated in FIG. 7, as the predicted output value of the fuel cell 20. The required output required for the fuel cell 20 by the air-conditioning device 70 is estimated based on an outside air temperature. FIG. 10 illustrates a map in which a relationship between the required output required for the fuel cell 20 by the air-conditioning device 70 and the outside air temperature is defined. This map is calculated in advance by experiment and is stored in the memory 64 of the control device 60. In this map, when the temperature of the vehicle interior is held at a predetermined temperature, for example, 25° C., the required output required for the fuel cell 20 by the air-conditioning device 70, which varies depending on the outside air temperature, is defined. As a difference between a predetermined temperature and the outside air temperature increases, it is necessary to increase a flow rate of a refrigerant carried by the air-conditioning compressor 71*b* and the power consumption of the air-conditioning compressor 71*b* also increases. Accordingly, the required output for the fuel cell 20 also increases. The outside air temperature refers to the outside air temperature around the vehicle 1 and is acquired by the control device 60 using an outside air temperature sensor mounted in the vehicle 1. In this way, by considering the output of the fuel cell 20 consumed by the air-conditioning device 70 in addition to the gradient and the predicted vehicle speed on the scheduled traveling route at the time of calculating the predicted output value of the fuel cell 20, it is possible to more accurately calculate the predicted output value of the fuel cell 20. Accordingly, it is possible to more appropriately determine whether it is necessary to perform recovery processing A. The calculating of the predicted output value of the fuel cell 20 in consideration of the required output required for the fuel cell 20 by the air-conditioning device 70 is performed only when the air-conditioning device 70 is activated, but is not performed when the air-conditioning device 70 is stopped.

The server 100 may calculate the predicted output value of the fuel cell 20 in consideration of the required output required for the fuel cell 20 by the air-conditioning device 70. In this case, the map illustrated in FIG. 10 is stored in the HDD 104 of the server 100 in correlation with the identification information of the vehicle by vehicle types. The control device 60 acquires the maximum value of the predicted output value calculated by the server 100 with reference to the identification information of the vehicle 1 and the identification information stored in the HDD 104.

Figure 11:
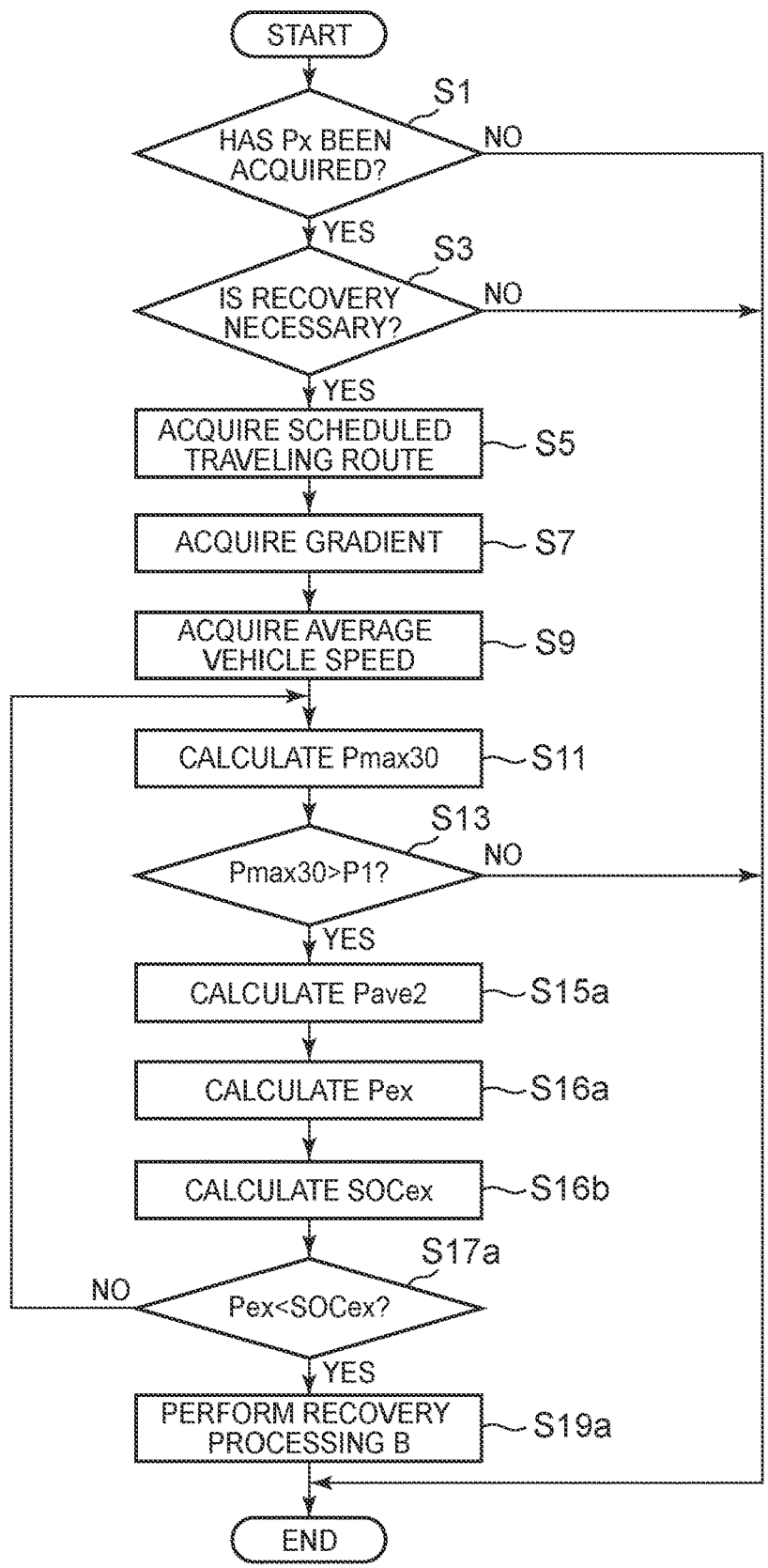
FIG. 11 is a flowchart illustrating an example of recovery control according to a first modified example.

A plurality of modified examples of the recovery control will be described below. In the modified examples of the recovery control, the same processes will be referenced by the same reference signs and description thereof will not be repeated. Recovery control according to a first modified example will be described. In the first modified example, recovery processing B other than recovery processing A is performed. Recovery processing B is a process of removing oxide coats or poisoning materials to recover the catalyst from short-term performance deterioration by decreasing an output voltage and increasing an amount of water generated by power generation by control of the output of the fuel cell 20 to a high output. FIG. 11 is a flowchart illustrating an example of the recovery control according to the first modified example. When the determination result of Step S13 is negative, this control routine ends. When the determination result of Step S13 is positive, an average value Pave2 of the predicted output values of the fuel cell 20 in a predetermined time, specifically, two minutes, from the current time point is calculated (Step S15*a*).

Then, extra power Pex is calculated (Step S16*a*). The extra power Pex has a value obtained by subtracting the average value Pave2 of the predicted output value in the same period from the output value of the fuel cell 20 which is predicted when recovery processing B is performed in a predetermined period, for example, two minutes and refers to extra power of the fuel cell 20 during recovery processing B. The output value of the fuel cell 20 which is predicted when the recovery processing B is performed for two minutes is acquired in advance by experiment and is stored in the memory 64 of the control device 60. Then, an extra state of charge SOCex is calculated (Step S16*b*). The extra state of charge SOCex is a value obtained by subtracting a state of charge of the battery 52 at the current time point from an upper-limit state of charge of the battery 52 and refers to an extra state of charge by which the battery 52 can be additionally charged from the state of charge at the current time point.

Then, it is determined whether the extra power Pex is less than the extra state of charge SOCex (Step S17*a*). When the determination result is negative, that is, when it is determined that the battery 52 cannot be charged with the overall extra power Pex of the fuel cell 20 during recovery processing B, the processes of Step S15 and steps subsequent thereto are repeatedly performed. When the determination result is positive, recovery processing B is performed for two minutes (Step S19*a*). Accordingly, it is possible to charge the battery 52 with the extra power Pex of the fuel cell 20 and to minimize waste of power generated by the fuel cell 20.

In the first modified example, when the determination result of Step S13 is negative and the determination result of Step S3 is positive, recovery processing B is not performed. Accordingly, it is possible to cope with requirement for a high output for the fuel cell 20 and to minimize long-term deterioration of the output performance of the fuel cell 20. It is possible to determine whether it is necessary to more appropriately perform recovery processing B based on the predicted output value of the fuel cell 20 which has been accurately calculated.

In the first modified example, an execution period of recovery processing B is not limited to two minutes. In this case, an output value of the fuel cell 20 which is predicted when recovery processing B is performed in the execution period is stored in advance in the memory 64 of the control device 60 in correlation with the execution period of recovery processing B and the extra power Pex is calculated using an average value of the predicted output values of the fuel cell 20 in the execution period. In the first modified example, when the determination result of Step S13 is positive, recovery processing B may be immediately performed without performing the processes of Steps S15 to S17*a*.

In the first modified example, the control device 60 and the server 100 may perform the recovery control in cooperation with each other. For example, the control device 60 may perform the processes of Steps S16*b*, S17*a*, and S19*a* and the server 100 may perform the processes of Steps S13, S15, and S16*a*. In this case, the output of the fuel cell 20 which is predicted when recovery processing B is performed in a predetermined period is stored in the HDD 104 for each vehicle type.

Recovery control according to a second modified example will be described below. In the second modified example, an operation mode of the fuel cell 20 can be switched from a normal mode to an echo mode when predetermined conditions are satisfied. The echo mode refers to control of setting the upper-limit output of the fuel cell 20 to be less than that in the normal mode. The recovery control according to the second modified example is performed by a diagnosis unit, a recovery unit, a calculation unit, a determination unit, an acquisition unit, and an upper-limit output changing unit which are functionally embodied by the CPU 61, the ROM 62, the RAM 63, and the memory 64 of the control device 60.

Figure 12:
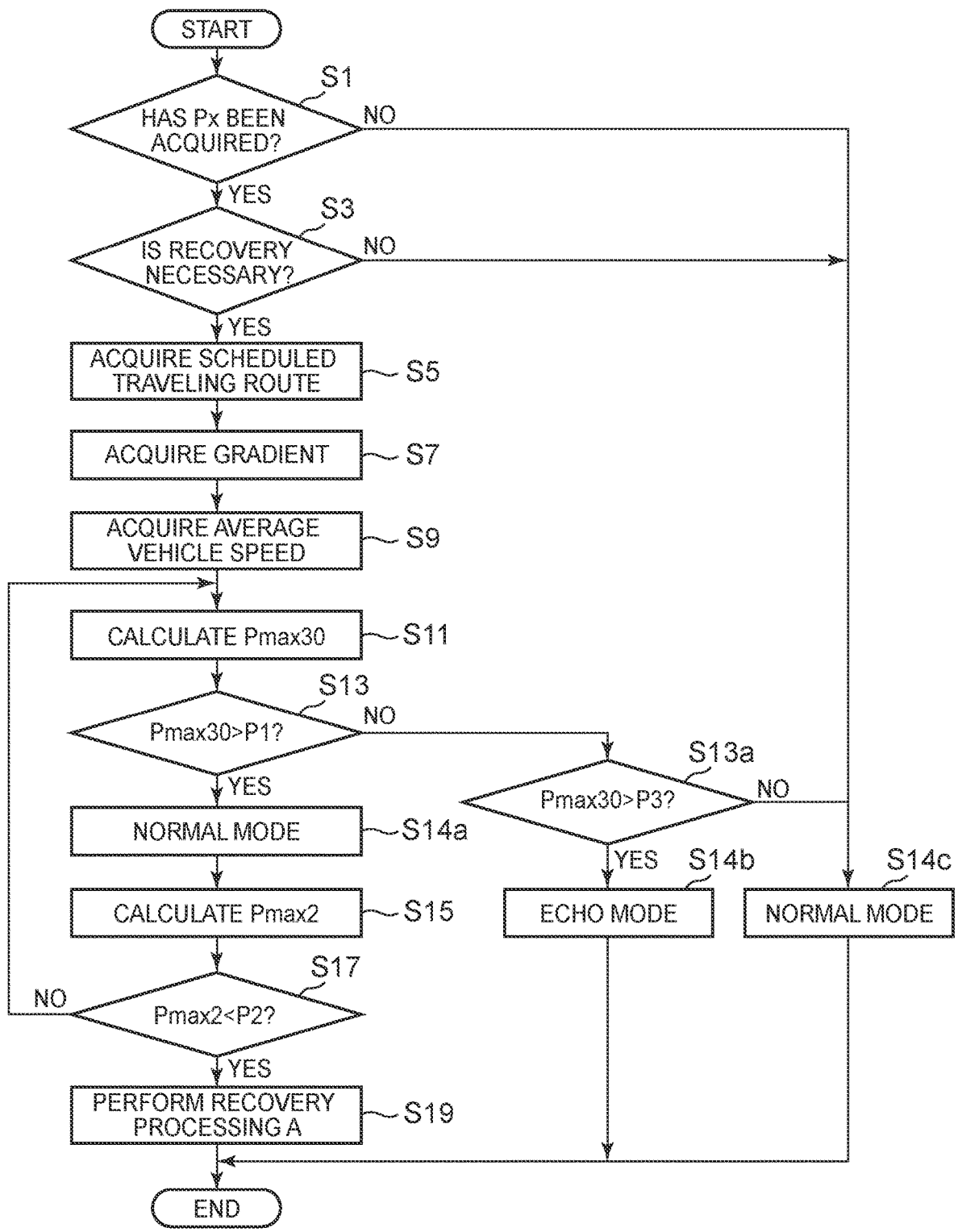
FIG. 12 is a flowchart illustrating an example of recovery control according to a second modified example.

FIG. 12 is a flowchart illustrating an example of the recovery control according to the second modified example. The operation mode of the fuel cell 20 is set to the normal mode (Step S14*a*) when the determination result of Step S13 is positive, and it is determined whether the maximum value Pmax30 is greater than a threshold value P3 (Step S13*a*) when the determination result is negative. The threshold value P3 is an example of the second threshold value which is less than the threshold value P1.

The operation mode is set to the echo mode (Step S14*b*) when the determination result of Step S13*a* is positive, and the operation mode is set to the normal mode (Step S14*c*) when the determination result is negative. The case in which the determination result of Step S13*a* is positive is a case in which an output in which the maximum value Pmax30 is intermediate between the threshold value P1 and the threshold value P3 is required for the fuel cell 20. That is, the operation mode is set to the echo mode when it is predicted that an intermediate output is required for the fuel cell 20 in which the output performance deteriorates over a short term due to the short-term performance deterioration of the catalyst. Here, when the intermediate output is predicted to be required for the fuel cell 20, the vehicle 1 can travel without performing recovery processing A and the threshold value P1 with which recovery processing A should be performed can be set to be larger than that in the above-mentioned embodiment, by performing the operation mode to the echo mode. Accordingly, it is possible to minimize an execution frequency of recovery processing A in comparison with the above-mentioned embodiment. The processes of Steps S14a to S14c are an example of a process which is performed by the upper-limit output changing unit that changes an upper limit of the output of the fuel cell 20.

In the second modified example, when the process of Step S13a is not performed and the determination result of Step S13 is negative, the operation mode may be set to the echo mode. In this case, it is possible to prevent a high output from being actually required for the fuel cell 20 and to minimize the execution frequency of recovery processing A. In the second modified example, the control device 60 and the server 100 may perform the recovery control in cooperation with each other. For example, the control device 60 may perform the processes of Steps S14a, S14b, and S14c and the server 100 may perform the processes of Steps S13 and S13a.

Recovery control according to a third modified example will be described below. In the third modified example, a target state of charge of the battery 52 is increased when predetermined conditions are satisfied. The recovery control according to the third modified example is performed by a diagnosis unit, a recovery unit, a calculation unit, a determination unit, an acquisition unit, and a state-of-charge changing unit which are functionally embodied by the CPU 61, the ROM 62, the RAM 63, and the memory 64 of the control device 60.

Figure 13:
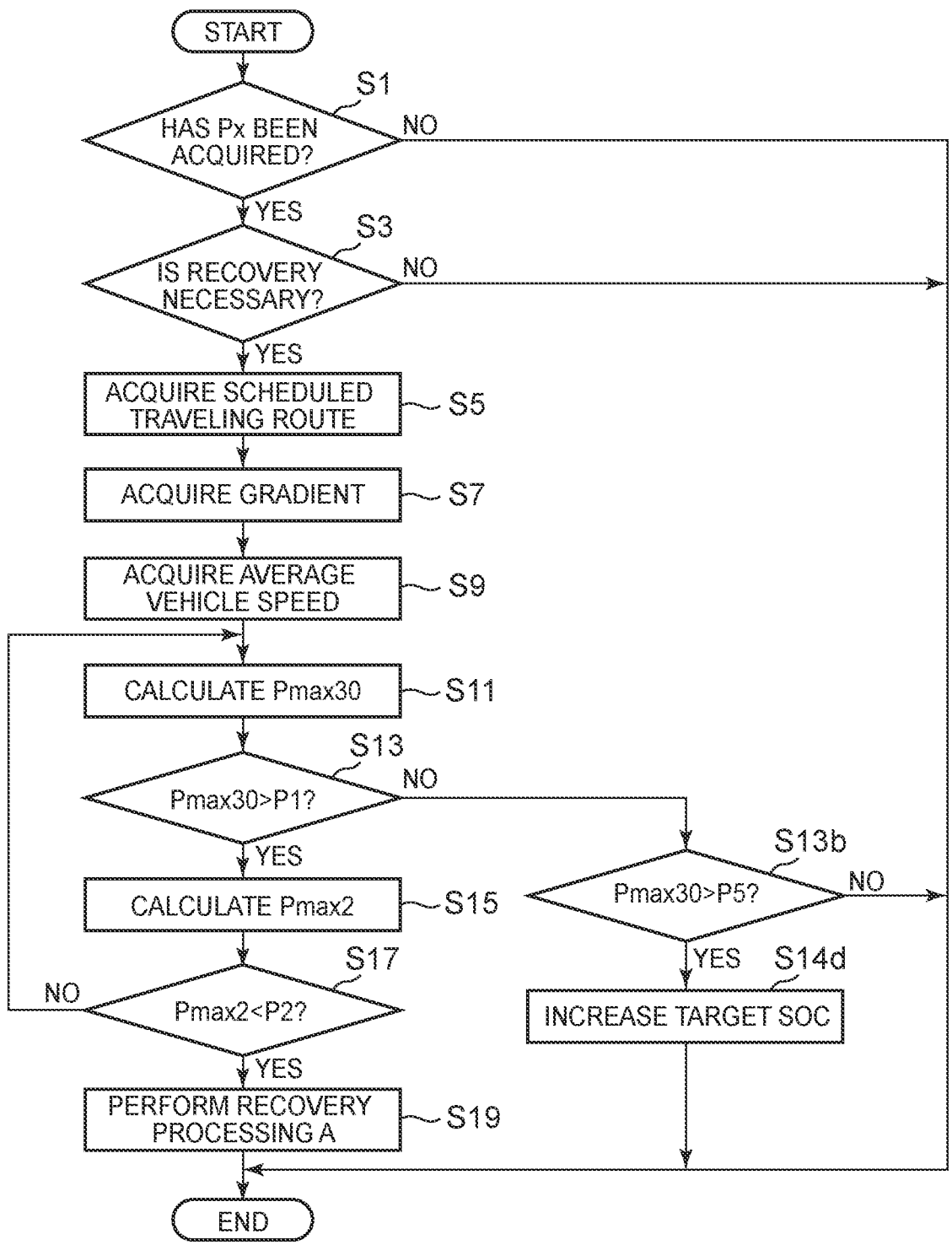
FIG. 13 is a flowchart illustrating an example of recovery control according to a third modified example.

FIG. 13 is a flowchart illustrating an example of the recovery control of the third modified example. When the determination result of step S13 is negative, it is determined whether the maximum value Pmax30 is greater than a threshold value P5 (Step S13b). The threshold value P5 is an example of the second threshold value which is less than the threshold value P1.

This control routine ends when the determination result of Step S13b is negative, and the target state of charge of the battery 52 is increased by a predetermined value when the determination result is positive (Step S14d). The process of Step S14d is an example of a process which is performed by the state-of-charge changing unit that changes the target state of charge of the battery 52 which can be output to compensate for the output of the fuel cell 20.

The case in which the determination result of Step S13b is positive is a case in which an output in which the maximum value Pmax30 is intermediate between the threshold value P1 and the threshold value P5 is required for the fuel cell 20. When the intermediate output is predicted to be required for the fuel cell 20, the vehicle 1 can travel without performing recovery processing A by temporarily increasing the target state of charge of the battery 52 to enable output compensation of the battery 52. Accordingly, the threshold value P1 with which recovery processing A should be performed can be set to be larger than that in the above-mentioned embodiment and thus it is possible to minimize an execution frequency of recovery processing A in comparison with the above-mentioned embodiment.

In the third modified example, the control device 60 and the server 100 may perform the recovery control in cooperation with each other. For example, the control device 60 may perform the process of Step S14d and the server 100 may perform the process of Step S13b.

In the first to third modified examples, the output of the fuel cell 20 which is consumed by the air-conditioning device 70 may be considered at the time of calculating the predicted output value of the fuel cell 20. The processes of Steps S15a, S516a, S16b, S17a, and S19a in the first modified example may be employed as the processes of Step S14a and steps subsequent thereof in the second modified example and the processes after the determination result of Step 13a in the third modified example is positive.

Figures 14A, 14B:
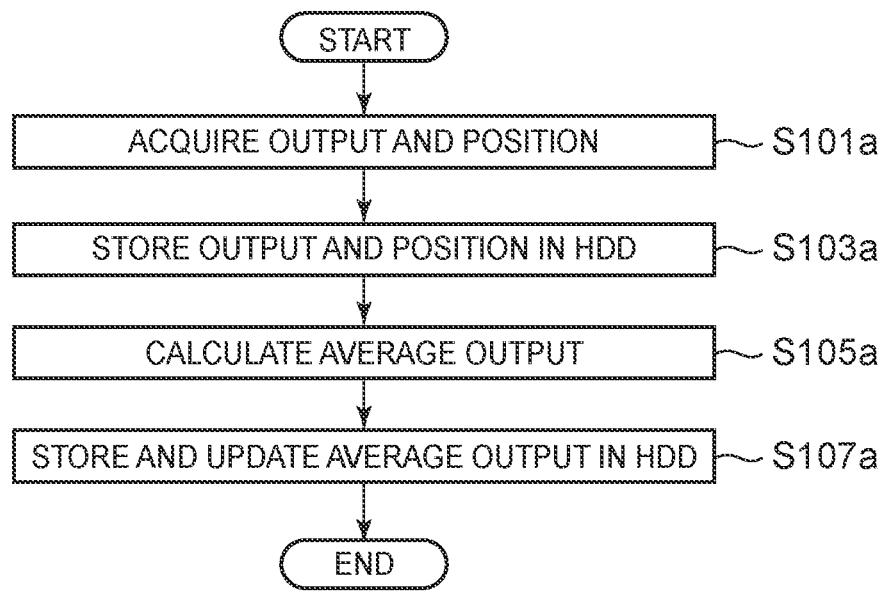
FIG. 14A is a diagram illustrating an example of an average output which is stored in an HDD of the server.
FIG. 14B is a flowchart illustrating an example of control for calculating an average output.

Recovery control according to a fourth modified example will be described below. In the fourth modified example, the maximum value Pmax30 is calculated based on an average output stored in the server 100 instead of the average vehicle speed. First, the average output will be described below. FIG. 14A illustrates an example of the average output stored in the HDD 104 of the server 100. In the HDD 104, outputs of a fuel cell group of a fuel-cell vehicle group which are correlated with position information of the fuel-cell vehicle group using a fuel cell as a power source for traveling and an average output of the fuel cell group at each point are stored.

Control for calculating an average output which is performed by the server 100 will be described below. FIG. 14B is a flowchart illustrating an example of the control for calculating an average output. This control is repeatedly performed in a predetermined cycle. First, current locations of a plurality of fuel-cell vehicles and outputs of fuel cells of the vehicles at each location are acquired from the vehicles via the network N (Step S101a). Then, the acquired locations and outputs are stored in the HDD 104 in correlation with each other (Step S103a). Then, an average output which is an average value of the outputs is calculated based on the outputs of the plurality of fuel cells acquired at the same point (Step S105a). The calculated average output is stored and updated in the HDD 104 in correlation with the points (Step S107a). Accordingly, the average output at each point is an average value of outputs of a fuel cell group of a fuel-cell vehicle group including the vehicle 1 when the vehicle 1 has ever traveled through the point, and is an average value of outputs of fuel cell group of a fuel-cell vehicle group not including the vehicle 1 when the vehicle 1 has never traveled through the point. Accordingly, at least one of the output of the fuel cell 20 when the vehicle 1 traveled on the scheduled traveling route of the vehicle 1 and the output of the fuel cell of another vehicle when the other vehicle traveled on the scheduled traveling route is reflected in the average output at each point.

Figure 15:
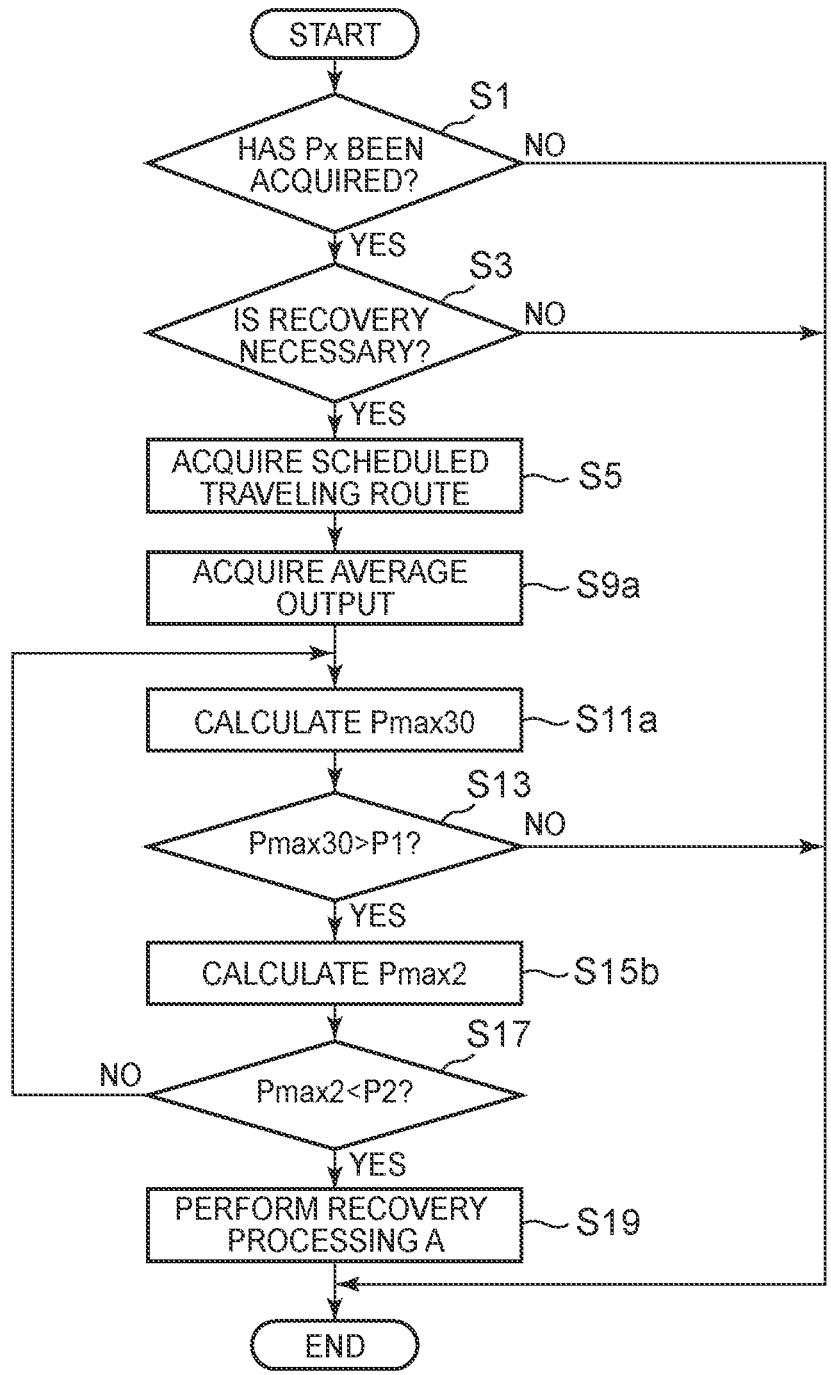
FIG. 15 is a flowchart illustrating an example of recovery control according to a fourth modified example.

FIG. 15 is a flowchart illustrating an example of the recovery control according to the fourth modified example. The recovery control according to the fourth modified example is performed by a diagnosis unit, a recovery unit, a calculation unit, a determination unit, and an acquisition unit which are functionally embodied by the CPU 61, the ROM 62, the RAM 63, and the memory 64 of the control device 60. After the scheduled traveling route is acquired in Step S5, the gradients or the average vehicle speeds are not acquired and the average output at each point on the scheduled traveling route is acquired from the server 100 (Step S9a). The process of Step S9a is an example of a process which is performed by the acquisition unit that acquires the output from the server 100.

Then, the maximum value Pmax30 of the predicted output value is calculated based on the average output at each point on the scheduled traveling route (Step S11a). The process of Step S11a is an example of a process which is performed by the calculation unit that calculates a parameter correlated with the predicted output value of the fuel cell which is predicted to be output on the scheduled traveling route based on at least one of the output of the fuel cell 20 when the vehicle 1 travels on the scheduled traveling route of the vehicle 1 and an output of another fuel cell mounted as a power source in another vehicle when the other vehicle travels on the scheduled traveling route. When the determination result of Step S13 is positive, the maximum value Pmax2 is calculated based on the acquired average output at each point (Step S15b). In this way, since the parameter correlated with the predicted output value of the fuel cell 20 of the vehicle 1 is calculated based on the average output stored in the server 100, it is possible to reduce a load of the calculating process of the control device 60. Since the predicted output value of the fuel cell 20 of the vehicle 1 can be accurately calculated based on the average output stored in the server 100, it is possible to further appropriately determine whether it is necessary to perform recovery processing A.

In the fourth modified example, the predicted output value of the fuel cell 20 may be calculated in consideration of the output of the fuel cell 20 which is consumed by the air-conditioning device 70. For example, when the average output acquired by the control device 60 of the vehicle 1 is data which has been updated, for example, in the past in one hour from the current time point, the outside air temperature at the current time point can be regarded to be substantially the same as the outside air temperature at the time point at which the average output is calculated. Accordingly, since the required output required by the air-conditioning device 70 at the current time point is substantially the same as the required output required by the air-conditioning device 70 when the average output has been calculated, the predicted output value may be calculated without correcting the acquired average output. On the other hand, when the average output acquired by the control device 60 of the vehicle 1 is data which has been updated, for example, in the past in several hours from the current time point, there is a likelihood that the outside air temperature at the current time point will be different from the outside air temperature at the time point at which the average output is calculated and the required output required by the air-conditioning device 70 will be different. In this case, the predicted output value may be calculated by calculating the required output required by the air-conditioning device 70 from the outside air temperature at the time of the average output is calculated and the current outside air temperature using the map illustrated in FIG. 10 and adding or subtracting the difference therebetween.

The predicted output value of the fuel cell 20 of the vehicle 1 may be calculated based on an average output of a fuel cell group of a fuel-cell vehicle group having the same vehicle type or model number as the vehicle 1 among outputs of fuel cell groups stored in the server 100. Accordingly, it is possible to more accurately calculate the predicted output value of the fuel cell 20 of the vehicle 1 and to determine whether it is necessary to further appropriately perform recovery processing A. In this case, the server 100 calculates the average output for each vehicle type or each model number based on the identification information of the fuel-cell vehicles and the outputs of the fuel cells at each point which are transmitted from the fuel-cell vehicle group, and stores the calculated average outputs in the HDD 104. The control device 60 acquires the average output of the fuel cells having the same vehicle type or model number as the vehicle 1 with reference to the identification information of the vehicle 1 and the identification information stored in the HDD 104.

The predicted output value of the fuel cell 20 of the vehicle 1 may be calculated by correcting the average output of the fuel cell group stored in the server 100 depending on the vehicle type of the vehicle 1. For example, when the vehicle 1 is a large-sized vehicle, a value which has been corrected to increase the average output stored in the server 100 may be calculated as the predicted output value of the fuel cell 20 of the vehicle 1. In this case, the control device 60 of the vehicle 1 may perform the correction or the server 100 may perform the correction.

In the fourth modified example, the recovery control may be performed as follows similarly to the above-mentioned embodiment. The above-mentioned average value, accumulated time, area, or the like may be used instead of the maximum value of the predicted output value. The average output acquired from the server 100 may be an average output of a partial vehicle group into which all fuel-cell vehicles are classified based on a predetermined criterion. The previous average output stored in the server 100 may be used. The predicted output value of the fuel cell 20 may be calculated based on the average output stored in the server 100, or a value obtained by correcting the average output stored in the server 100, for example, based on a difference between the actual output of the fuel cell 20 of the vehicle 1 and the average output stored in the server 100 in a predetermined traveling section may be used as the predicted output value of the fuel cell 20. The output of the fuel cell 20 when the vehicle 1 actually traveled on the scheduled traveling route in the past may be acquired from the server 100 and the predicted output value of the fuel cell 20 may be calculated based on the acquired output. When an average output at a certain point on the scheduled traveling route of the vehicle 1 stored in the server 100 is based on only the output of a fuel cell of a single vehicle, the predicted output value of the vehicle 1 is calculated based on the output of the single vehicle. In this case, the output stored in the server 100 may be the output of the fuel cell 20 when the vehicle 1 traveled in the past or may be an output of a fuel cell of another vehicle.

In the recovery control according to the fourth modified example, similarly to the above-mentioned embodiment, the control device 60 and the server 100 may perform the recovery control in cooperation with each other. For example, the control device 60 may perform the processes of Steps S1, S3, and S19 and the server 100 may perform the processes of Steps S5 to S17. The server 100 may perform the processes of Steps S1 to S17 and the control device 60 may perform the process of Step S19.

In the first to third modified examples, similarly to the fourth modified example, the predicted output value of the fuel cell 20 may be calculated based on the average output stored in the server 100 or the output of the fuel cell 20 when the vehicle 1 traveled in the past.

While exemplary embodiments of the invention have been described above in detail, the invention is not limited to a specific embodiment, but can be modified in various forms without departing from the gist of the invention described in the appended claims.

What is claimed is:

1. An output performance recovering device for a fuel cell, comprising:
a recovery unit programmed:
to control a voltage of the fuel cell which is mounted as a power source for traveling in a vehicle and to perform recovery processing for recovering a catalyst of the fuel cell from short-term performance deterioration,
not to perform the recovery processing when it is not necessary to recover the catalyst from the short-term performance deterioration,
to perform the recovery processing when it is necessary to recover the catalyst from the short-term performance deterioration and a parameter correlated with a predicted output value of the fuel cell, which has been predicted to be output on a scheduled traveling route of the vehicle and which has been calculated based on a predicted vehicle speed of the vehicle on the scheduled traveling route, indicates that the predicted output value is greater than a first threshold value,
not to perform the recovery processing when the parameter indicates that the predicted output value is less than the first threshold value even if it is necessary to recover the catalyst from the short-term performance deterioration, and
to calculate the predicted vehicle speed based on an average vehicle speed which is an average value of traveling speeds of a vehicle group including or not including the vehicle when the vehicle group travels on the scheduled traveling route;
an acquisition unit programmed to acquire the predicted vehicle speed or the average vehicle speed from a server;
an upper-limit output changing unit programmed to change an upper limit of an output of the fuel cell; and
a state-of-charge changing unit programmed to change a target state of charge of a secondary battery that compensates for a shortage of an output of the fuel cell.

2. The output performance recovering device for the fuel cell according to claim 1, wherein the recovery unit is programmed to calculate the parameter additionally based on a gradient of the scheduled traveling route.

3. The output performance recovering device for the fuel cell according to claim 1, wherein the recovery unit is programmed to calculate the predicted output value in consideration of an output of the fuel cell which is consumed by an air-conditioning device of the vehicle.

4. The output performance recovering device for the fuel cell according to claim 1, wherein the upper-limit output changing unit is programmed to set the upper limit to be lower when the parameter indicates that the predicted output value is less than the first threshold value and greater than a second threshold value which is less than the first threshold value than when the parameter indicates that the predicted output value is greater than the first threshold value.

5. The output performance recovering device for the fuel cell according to claim 1, wherein the state-of-charge changing unit is programmed to set the target state of charge to be higher when the parameter indicates that the predicted output value is less than the first threshold value and greater than a second threshold value which is less than the first threshold value than when the parameter indicates that the predicted output value is greater than the first threshold value.

6. An output performance recovering device for a fuel cell, comprising:
a recovery unit programmed:
to control a voltage of the fuel cell which is mounted as a power source for traveling in a vehicle and to perform recovery processing for recovering a catalyst of the fuel cell from short-term performance deterioration,
not to perform the recovery processing when it is not necessary to recover the catalyst from the short-term performance deterioration,
to perform the recovery processing when it is necessary to recover the catalyst from the short-term performance deterioration and a parameter correlated with a predicted output value of the fuel cell which has been predicted to be output on a scheduled traveling route of the vehicle, which has been calculated based on at least one of an output of the fuel cell when the vehicle travels on the scheduled traveling route of the vehicle and an output of another fuel cell which is mounted as a power source in another vehicle when the other vehicle travels on the scheduled traveling route, indicates that the predicted output value is greater than a first threshold value, and
not to perform the recovery processing when the parameter indicates that the predicted output value is less than the first threshold value even if it is necessary to recover the catalyst from the short-term performance deterioration
an acquisition unit programmed to acquire the output of the other fuel cell from a server;
an upper-limit output changing unit programmed to change an upper limit of the output of the fuel cell; and
a state-of-charge changing unit programmed to change a target state of charge of a secondary battery that compensates for a shortage of the output of the fuel cell.

7. The output performance recovering device for the fuel cell according to claim 6, wherein the recovery unit is programmed to calculate the predicted output value in consideration of the output of the fuel cell which is consumed by an air-conditioning device of the vehicle.

8. The output performance recovering device for the fuel cell according to claim 6, wherein the upper-limit output changing unit is programmed set the upper limit to be lower when the parameter indicates that the predicted output value is less than the first threshold value and greater than a second threshold value which is less than the first threshold value than when the parameter indicates that the predicted output value is greater than the first threshold value.

9. The output performance recovering device for the fuel cell according to claim 6, wherein the state-of-charge changing unit is programmed to set the target state of charge to be higher when the parameter indicates that the predicted output value is less than the first threshold value and greater than a second threshold value which is less than the first threshold value than when the parameter indicates that the predicted output value is greater than the first threshold value.

* * * * *